US008229459B2

(12) United States Patent
Wigren

(10) Patent No.: US 8,229,459 B2
(45) Date of Patent: Jul. 24, 2012

(54) METHOD AND ARRANGEMENT FOR ENHANCED CELL IDENTIFICATION AND CELL POSITIONING

(75) Inventor: Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 556 days.

(21) Appl. No.: 12/445,290

(22) PCT Filed: Dec. 4, 2006

(86) PCT No.: PCT/SE2006/050535

§ 371 (c)(1), (2), (4) Date: Apr. 11, 2009

(87) PCT Pub. No.: WO2008/069712

PCT Pub. Date: Jun. 12, 2008

(65) Prior Publication Data

US 2010/0099433 A1 Apr. 22, 2010

(51) Int. Cl.
*H04W 24/00* (2009.01)

(52) U.S. Cl. ................ 455/456.1; 455/422.1; 455/67.11

(58) Field of Classification Search ............... 455/456.1, 455/456.6, 404.1
See application file for complete search history.

(56) References Cited

U.S. PATENT DOCUMENTS 7,203,499 B2 4/2007 Wigren et al.
2003/0216142 A1 11/2003 Wigren et al.
2004/0067759 A1 4/2004 Spirito et al.
2004/0203856 A1 10/2004 Wigren et al.
2005/0176441 A1 * 8/2005 Jurecka ...................... 455/456.1
2006/0194588 A1 * 8/2006 Zhao .......................... 455/456.1
2008/0200187 A1 * 8/2008 Lin et al. .................... 455/456.6

FOREIGN PATENT DOCUMENTS

JP 2005-283237 A 10/2005
WO 03098257 A1 11/2003

OTHER PUBLICATIONS

Kaplan, E.D., "Understanding GPS Principles and Applications," Norwood, MA: Artech House, 1996; ISBN 0-89006-793-7.
International Search Report for PCT/SE2006/050535 mailed Sep. 12, 2007.
International Preliminary Report on Patentability for PCT/SE2006/050535 dated Dec. 12, 2008.

(Continued)

*Primary Examiner* — Nick Corsaro
*Assistant Examiner* — Isaak R Jama
(74) *Attorney, Agent, or Firm* — Potomac Patent Group PLLC

(57) ABSTRACT

In a method of enhanced position determination of a user terminal associated with at least one cell in a cellular communications network, providing a predetermined cell identity definition SO1 providing S1 a representation of a barometric pressure measure for the user terminal, said barometric pressure measure corresponding to an altitude of the user terminal, and determining S2 at least one geographical region definition based on the provided predetermined cell identity definition and the provided representation of barometric pressure measure, said at least one geographical region definition corresponding to a horizontal region associated with said predetermined cell identity definition and said representation of said barometric pressure measure.

25 Claims, 12 Drawing Sheets

OTHER PUBLICATIONS

3GPP TS 25.453 V8.1.0, Technical Specification, "3rd Generation Partnership Project; Technical Specification Group Radio Access Network; UTRAN lupc Interface Positioning Calculation Application Part (PCAP) signalling (Release 8)," Mar. 2009, pp. 1-306.

3GPP TS 25.413 V8.3.0, Technical Specification, "3rd Generation Partnership Project; Technical Specification Group Radio Access Network; UTRAN lu Interface Radio Access Network Application Part (RANAP) signalling (Release 8)," Jun. 2009, pp. 1-398.

3GPP TS 23.032 V8.0.0, Technical Specification, "3rd Generation Partnership Project; Technical Specification Group Services and System Aspects; Universal Geographical Area Description (GAD) (Release 8)," Dec. 2008, pp. 1-29.

3GPP TS 25.331 V5.19.0, Technical Specification, "3rd Generation Partnership Project; RRC Protocol Specification," Dec. 2006, pp. Jan. 1045.

Polar AXN500, retrieved from www.polarusa.com on Aug. 10, 2009.

Kangas, A., et al., "Location Coverage and Sensitivity With A-GPS," URSI EMTS 2004, May 2004, pp. 361-363.

Extended European Search Report issued in related EP application No. 06824603.2, dated Jan. 26, 2001.

Japanese Office Action with partial English translation issued in corresponding Japanese Patent Application No. JP2006-504110 dated Jan. 30, 2012.

* cited by examiner

UE                                                                                    RNC

Calibration measurement

← MEASUREMENT CONTROL

Barometric calibration pressure / altitude
Calibration pressure / altitude uncertainty
Validity time interval

MEASUREMENT REPORT →

Measured barometric pressure / altitude
Barometric pressure / altitude uncertainty

METHOD AND ARRANGEMENT FOR ENHANCED CELL IDENTIFICATION AND CELL POSITIONING

RELATED APPLICATIONS

This application claims priority and benefit from International Application No. PCT/SE2006/050535, filed Dec. 4, 2006, the entire teachings of which are incorporated herein by reference.

TECHNICAL FIELD

The present invention relates in general to methods and systems for position determination of mobile terminals in a cellular communications network, and in particular to such position determination involving cell areas.

BACKGROUND

All cellular communications systems are divided into cells, where User Equipment (UE) served by one, or when in soft (er) handover several base stations. Each base station may serve UEs in more than one cell. The important point from a positioning and navigation perspective is that the cell where a specific UE is located is known in the cellular system. Hence, after determination of the geographical area covered by a specific cell, it can be stated that the UE is located somewhere within said geographical area, as long as it is connected and the reported cell identity of the serving cell is equal to the cell identity corresponding to the particular geographical area.

In several systems, among these the WCDMA (Wideband Code Division Multiple Access) system, the preferred representation of the geographical extension of the cell is given by the cell polygon format [1]. The extension of a cell is described by 3-15 corners of a closed polygon that does not intersect itself, see FIG. 1. The format is two-dimensional and the corners are determined as pairs of longitudes and latitudes in the WGS84 geographical reference system, see [1] for details. FIG. 2 describes the exact messaging format.

An example of positioning within a Wideband Code Division Multiple Access (WCDMA) cellular system operates briefly as follows, assuming that the positioning operates over the Radio Access Network Application Part (RANAP) interface. The procedures are however similar for e.g. the Global System for Mobile communications (GSM) and Code Division Multiple Access 2000 (CDMA 2000).

A message (LOCATION REPORTING CONTROL) requesting a location estimate is received in the Serving Radio Network Controller (SRNC) over the RANAP interface [2]. The quality of service parameters (most importantly accuracy and response time) of the message is assumed to be such that the Radio Network Controller (RNC) selects the cell identity positioning method. Subsequently, the SRNC determines the serving cell identity of the UE to be positioned (special procedures may apply in cases the UE is in soft(er) handover with multiple base stations) and retrieves a pre-stored polygon that represents the extension of the serving cell. Finally, the SRNC sends the resulting cell polygon back to the core network over the RANAP interface [2], using a cell polygon format in a location report message.

Within the WCDMA system an alternative to reporting over RANAP has been defined. This alternative constitutes reporting to the SAS node, over the PCAP interface [3]. The SAS node is a "broken out" positioning node.

It should, however, be noted that due to the complexity of the radio propagation, the cell polygon format is only an approximation of the extension of the true cell. The selection of the polygon format is dictated by the need to have a reasonably flexible geographical representation format, taking e.g. computation complexities and reporting bandwidths into account.

Since the polygon format approximates the cell extension, the polygon is normally pre-determined in a cell-planning tool to represent the cell extension with a certain confidence. The confidence is intended to represent the probability that the UE is located within the polygon, conditioned on the fact that it is connected to the cell that is represented by the cell polygon. The underlying off-line calculation of the cell polygon can e.g. be based on coverage simulations of varying levels of sophistication. However, the end result is normally not very reliable when the confidence of the calculated cell extension is considered.

The accuracy of the cell identity positioning method is limited by the size of the cell, something that prevents it from being used in more sophisticated navigation applications. Its main advantages include a very low response time as well as the fact that it is widely spread and always available where there is cellular coverage. The cell identity method is also straightforward to implement and has no UE impact. The advantages has lead to an interest for the development of Enhanced cell identity (E-cell ID) positioning methods that aim at enhancing the accuracy of the basic cell identity method at the same time as the advantages of the method are retained.

One known principle for enhanced cell identity positioning (E-cell ID positioning) aims at combining the cell extension model or polygon with a distance measure. Two possibilities towards this end are Round Trip Time (RTT) measurements and path loss measurements. The more accurate of these two alternatives is the RTT measurement. The path loss measurement suffers from shadow fading effects, which result in accuracies that are of the order of half the distance to the UE. In the KIT measurement principle, the travel time of radio waves from the Radio Base Station (RBS) to the UE and back is measured. The RTT method alone defines a circle around the RBS. By combining this information with the cell polygon, left and right angles of the circle can be computed, see FIG. 3.

Another idea for enhanced cell identity positioning has been to use pre-calculated maps of the regions where the UE is in soft(er) handover with one or several cells. This typically occurs in areas where the distances to the serving RBSs are about the same. Such areas are significantly smaller than the whole cell and whenever the user equipment is in such an area, there is a possibility to determine its location with a better accuracy then with the basic cell identity positioning method. Normally these maps are pre-calculated in the planning tool, exactly as the ordinary cell polygons. It should be noted that it is generally difficult to achieve an accurate description of soft(er) handover regions with a specified confidence.

In some situations high-precision positioning is required. In the present disclosure, "high-precision positioning methods" are defined to denote positioning methods that have a potential to meet the North-American E-911 emergency positioning requirements. Methods that meet these requirements are capable of obtaining positioning accuracies of:

either (terminal based) 50 meters (67%) and 150 m (95%).

or (network based) 100 meters (67%) and 300 m (95%).

The so called Assisted Global Positioning System (A-GPS) is an enhancement of the Global Positioning System (GPS) [4]. An example of an A-GPS positioning system is displayed in FIG. 4. There GPS reference receivers attached to e.g. a cellular communication system collect assistance data that, when transmitted to GPS receivers in terminals connected to the cellular communication system, enhance the performance [5] of the GPS terminal receivers. Typically, A-GPS accuracy can become as good as 10 meters also without differential operation [4]. The accuracy becomes worse in dense urban areas and indoors, where the sensitivity is often not high enough for detection of the very weak signals from GPS satellites. Additional assistance data is collected from the cellular communication system directly, typically to obtain a rough initial estimate of the position of the terminal together with a corresponding uncertainty of the initial estimate. This position is often given by a cell identity positioning step. i.e. the position of the terminal is determined with cell granularity. Alternatively, a more accurate position can be obtained by round trip time positioning and/or soft(er) handover maps.

The Uplink Time Difference Of Arrival (UTDOA) positioning method is based on time of arrival measurements performed in several RBSs of transmissions from the UEs. The signal strengths are higher than in A-GPS, something that enhances the ability to perform positioning indoors. The accuracy of UTDOA is expected to be somewhat worse than that of A-GPS though, mainly because the radio propagation conditions are worse along the surface of the earth than when GPS radio signals are received from satellites at high elevation angles.

On account of the above, there is a need for improved methods and arrangements for position determination.

SUMMARY

A general object of the present invention is thus to provide for methods, arrangements and systems enabling improved position determination accuracy.

The above objects are achieved by methods, arrangements, and systems according to the attached patent claims.

In general words, the present invention discloses a method of enhanced position determination for user terminals in cellular communication networks. Accordingly, a basic embodiment of the present invention discloses a method of enhanced position determination of a user terminal associated with at least one cell in a cellular communications network. Initially, a predetermined cell identity definition is provided and a representation of a barometric pressure measure for the user terminal is provided, the barometric pressure measure corresponds to an altitude of the user terminal. Subsequently, at least one geographical region definition is determined based on the provided predetermined cell identity definition and the provided representation of barometric pressure measure. The at least one geographical region definition corresponds to a horizontal geographical region associated with the predetermined cell identity definition and the representation of said barometric pressure measure.

The present invention also provides arrangements and systems for carrying out the above-described method.

Among the numerous advantages of the present invention can be mentioned:

- Enhanced horizontal position determination accuracy, especially in hilly terrain.
- Providing altitude information faster than A-GPS.
- Providing altitude information indoors, where A-GPS lacks coverage.
- Providing altitude with accuracy comparable to A-GPS.
- Providing altitude without necessitating the presence of A-GPS hardware.

BRIEF DESCRIPTION OF THE DRAWINGS

The invention, together with further objects and advantages thereof, may best be understood by referring to the following description taken together with the accompanying drawings, in which.

ABBREVIATIONS

A-GPS Assisted GPS
AECID Adaptive Enhanced Cell IDentity
GPS Global Positioning System
PCAP Position Calculation Application Part
RAB Radio Access Bearer
RANAP Radio Access Network Application Part
RBS Radio Base Station
RNC Radio Network Controller
RRC Radio Resource Control
RTT Round Trip Time
SAS Stand-alone Assisted GPS Serving Mobile Location Center
SRNC Serving Radio Network Controller
WCDMA Wideband Code Division Multiple Access

DETAILED DESCRIPTION

In the present disclosure "position determination assisting data" is used to define data that is used in cell-related activities in cellular communications system, such as radio network planning or positioning based on cell-ID. In particular, it may refer to the cell relation configuration and related area definitions used in the present disclosure. This should not be mistaken for "assistance data", which in the present disclosure is used solely in A-GPS discussions.

In the present disclosure, WCDMA systems are used as a model system. However, anyone skilled in the art realizes that the basic principles of the present invention are applicable to any cellular communication system, e.g. GSM. The invention is thus not limited to the exemplifying embodiments as such.

Figure 5:
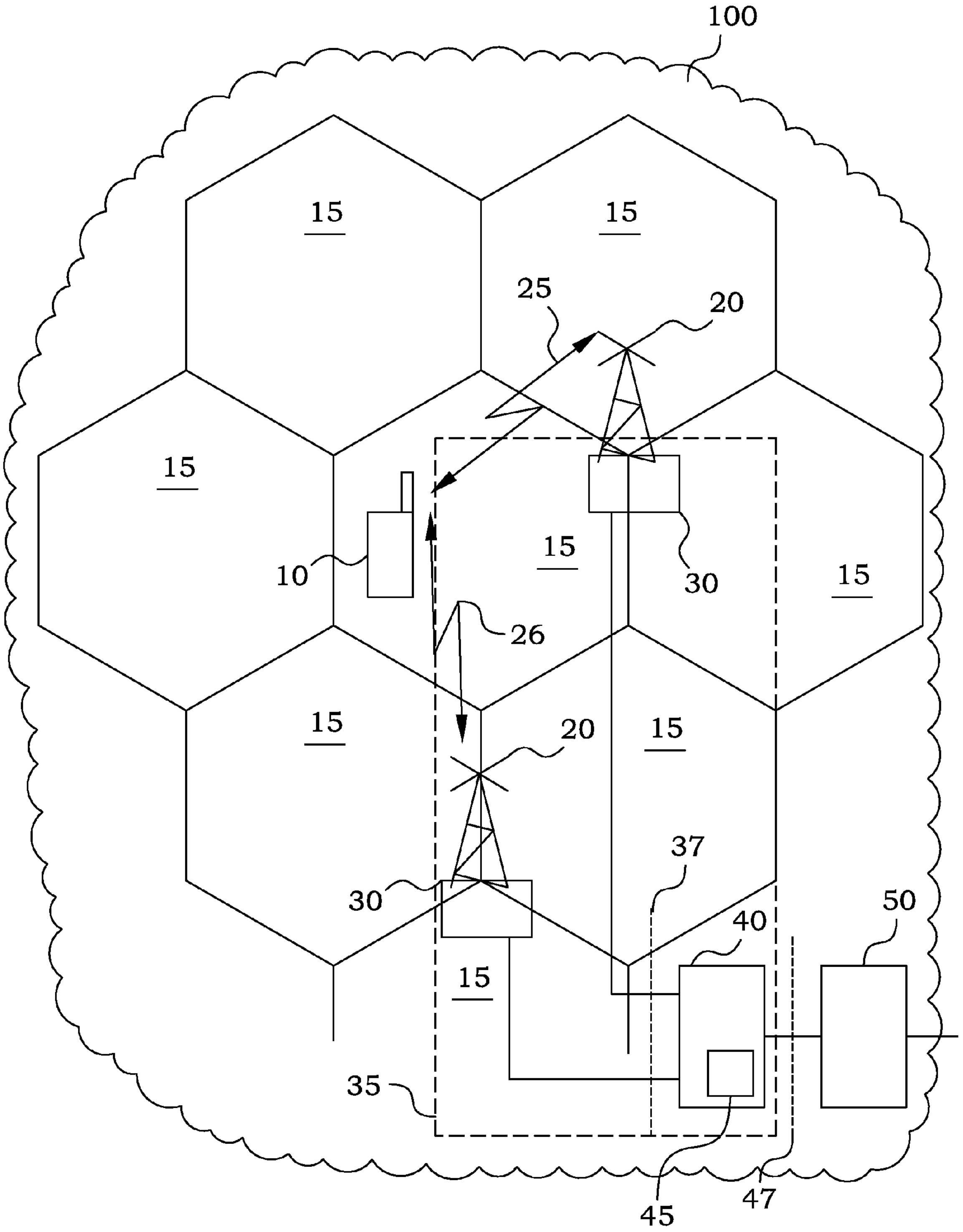
FIG. 5 is an illustration of a cellular communication system.

FIG. 5 illustrates a general WCDMA system 100. Radio base stations 30 (RBS) are spread over the coverage area of the system and serves antennas 20, which in this embodiment are sectorized antennas. A cell 15 is associated with each sector of the antennas 20, as the area in which connection to the communications system preferably is performed through that particular sector. The RBSs 30 are connected to a Radio Network Controller (RNC) node 40, which in a typical case comprises a positioning node 45. The UEs 10 and the RNC 40 communicates over the so-called RRC (Radio Resource Control) interface 37 that is transparent to the RBS 30. The RBSs 30 and the RNC 40 are nodes comprised in the UTRAN (Universal Mobile Telecommunication System Radio Access Network) 35. The RNC 40 is further connected to the Core Network (CN) 50 of the communications system 100 via a RANAP (Radio Access Network Application Part) interface 47.

User equipment (UE) 10 is situated in the area covered by the cellular communications system 100. The user equipment communicates with the own radio base station 30 through signals 25. However, also signals 26 from and to neighbouring RBSs 30 may be possible to detect. If the neighbouring signals 26 are strong enough for supporting actual communication, the corresponding cell could be included in a so-called active set of cells, which participates in soft(er) handover. (By soft handover is meant the case where two different non-collocated RBSs are used, whereas softer handover refers to one RBS with several sectors.) A special case is when the UE is connected to two sectors of the same RBS, i.e. softer handover. However, for the purpose of the present invention, there is no substantial difference between soft and softer handover and both cases can be handled analogously. The signal 26 may in some cases be too weak to be included in the active set, but strong enough to allow for identification of the transmitting RBS. Such signals may e.g. be used for positioning purposes. Finally, neighbouring signals 26 may also be too weak to enable any use at all.

When a UE 10 is connected to a certain RBS via certain radio links, the UE 10 is likely to be situated within the associated cell. The cell area, in WCDMA defined by a polygon that describes the cell extension, is normally not determined with the best possible accuracy, with respect to the true extension of the cell. The approximate cell area is typically determined in connection with cell planning and may not correspond perfectly to the real situation. Normally, the actual confidence level of the cell area extension is not specified. Furthermore, radio conditions may also be altered after the cell planning has been preformed. It would therefore be advantageous to tune the confidence and the pre-calculated cell polygon for each cell, using field data. This can normally not be afforded though, in particular since the radio conditions may change with time. The present invention disclosure reveals a way to obtain such tuning automatically.

Figure 6A:
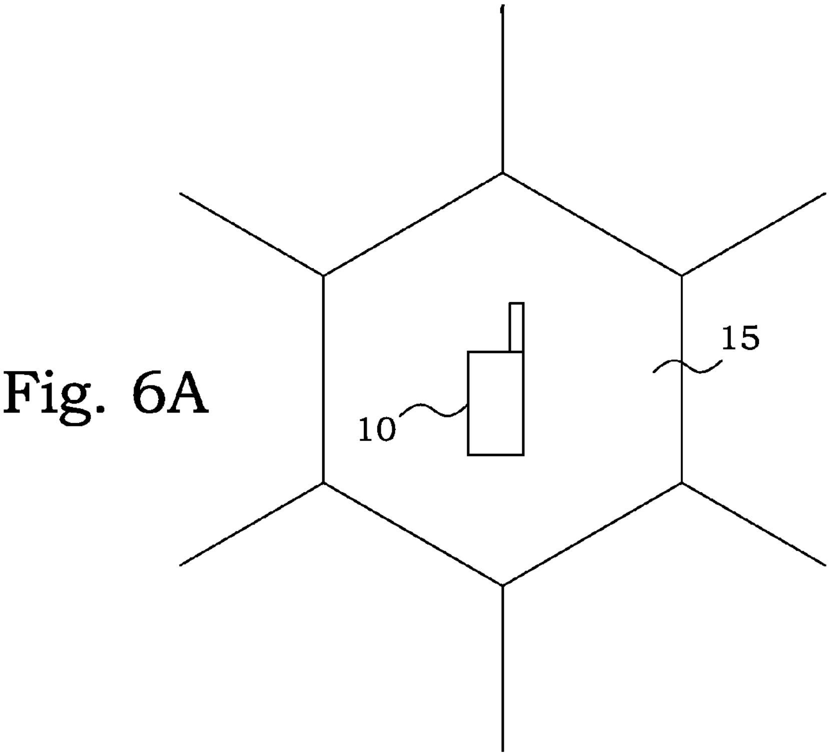
FIGS. 6A-E are illustrations of examples of division of a cell into smaller areas according to coverage from neighbouring cell signals.

FIG. 6A illustrates a cell 15, with a UE 10 connected. For simplicity in the coming explanations, the RBS is in this case assumed to be placed at the centre of the cell, a so-called omni-cell configuration. When the UE 10 is connected to the RBS, it can with a certain probability be determined to be present within the cell 15.

Figure 6B:
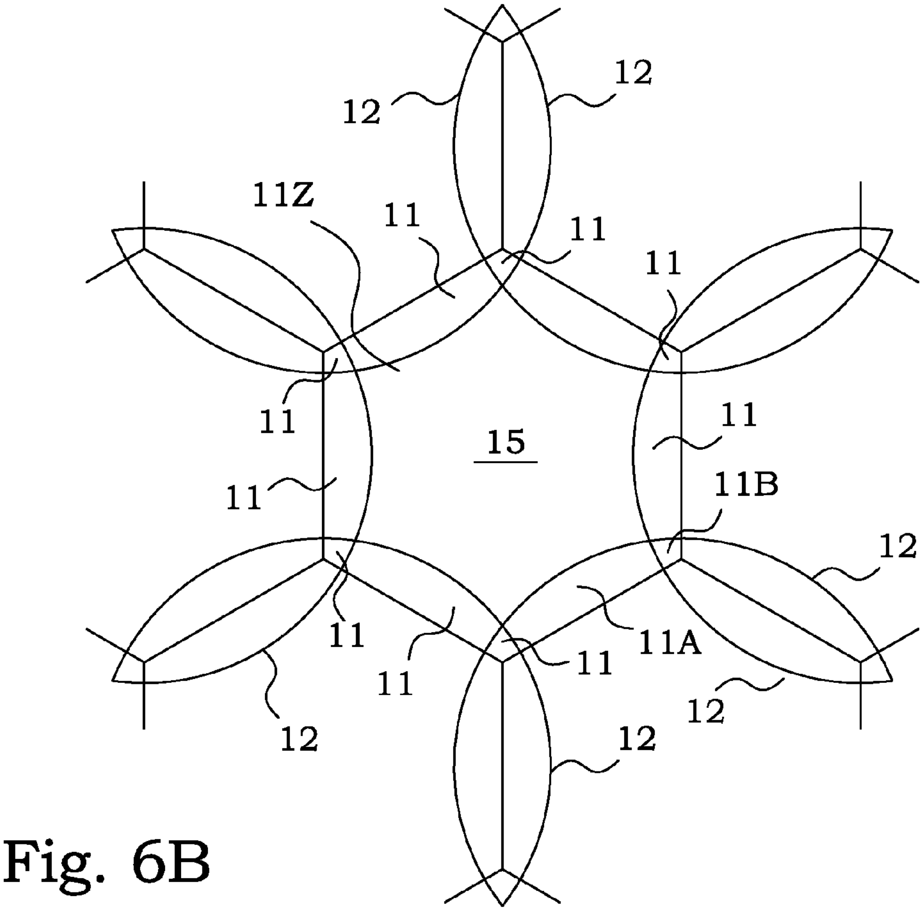

However, as mentioned briefly above, the UE may also be within radio range from other RBSs as well. In FIG. 6B, borders 12 of areas within which signals to/from a neighbouring RBS are strong enough to allow for soft(er) handover are indicated. In this oversimplified model, the borders 12 are drawn as circles, having their centre at a neighbouring RBS. It is easily seen that the borders 12 divide the cell 15 into smaller areas 11, 11A, 11B, 11Z. In the area 11Z, only signals from the own RBS 30 are useful. However, in e.g. area 11A, signals to/from one neighbouring RBS are also useful for soft(er) handover purposes and are thus included in the so-called active set of cells. In area 11B, signals to/from two neighbouring cells are strong enough and the active set then comprises two neighbouring cells. It can now easily be understood, that the content of the active set can be used for positioning purposes. By consulting the active set list, it can be determined in which of the part areas 11, 11A, 11B, 11Z, the UE 10 is likely to be situated.

However, most often, soft(er) handover information is not used for positioning purposes, probably since it is likely to be difficult to compute with a sufficient accuracy. In WCDMA, such area definitions can conveniently be polygon definitions. However, using prior art cell planning principles would normally not provide area definitions determined with the best possible accuracy, with respect to the true extension of any soft(er) handover regions. Furthermore, the confidence value of any soft(er) handover regions would normally, using prior art methods, not be determined with the best possible accuracy, with respect to any calculated soft(er) handover area. It would therefore be advantageous to tune the confidence and the pre-calculated cell polygon for each cell, using field data. This can normally not be afforded though, in particular since the radio conditions may change with time, even more than for the basic cell.

Figure 6C:
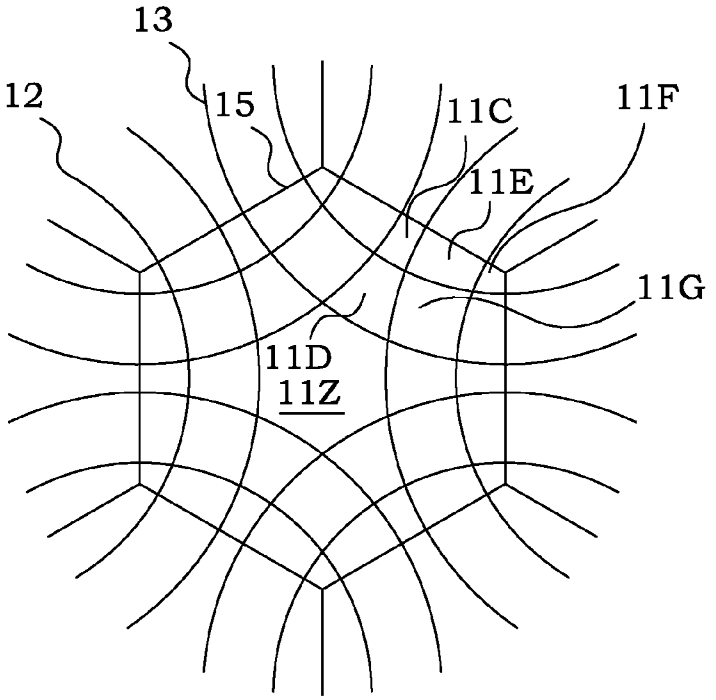

Signals from neighbouring RBSs can be utilized further. As mentioned above, even if the signals to and from neighbouring RBSs are not strong enough for allowing soft(er) handover, they may still be strong enough to enable determination of the identity of the transmitting RBS/UE. Corresponding set of cells is typically referred to as the detected set of cells. Also this information can be used for positioning purposes. In FIG. 6C, the cell 15 is once again illustrated. Now, not only borders 12 for soft(er) handover (of which only one is denoted by a reference number) are illustrated, but also borders 13 of areas in which the identity of the transmitting RBS or UE can be obtained in downlink or uplink, respectively, e.g. corresponding to the detected set of cells. The cell 15 is thereby further divided in even smaller part areas 11, 11C-G, and 11Z. For instance, in area 11E, signals from one neighbouring RBS are, besides the signals from the own RBS, used for soft(er) handover, while signals from another neighbouring RBS only are used for identifying the transmitting RBS.

Figure 6D:
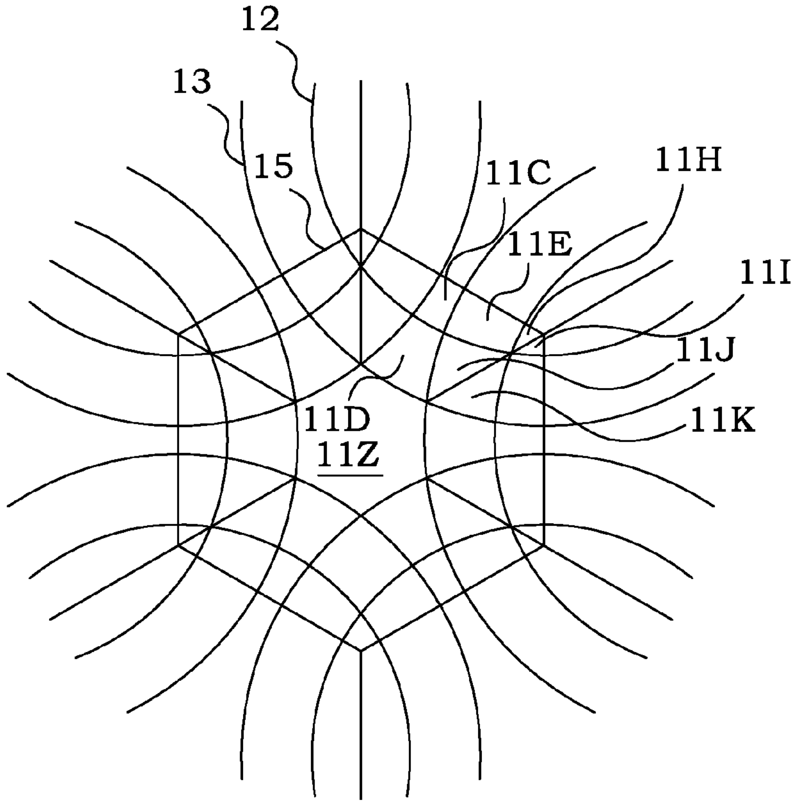

If not only the existence of signals of certain strengths are considered, but also the relative strengths as compared to other signals, an even finer division of the original cell can be achieved. In FIG. 6D, the part areas that involve signals from more than one neighbouring RBS are divided according to which signal that is the strongest. Areas 11H-K are thereby possible to define.

Figure 6E:
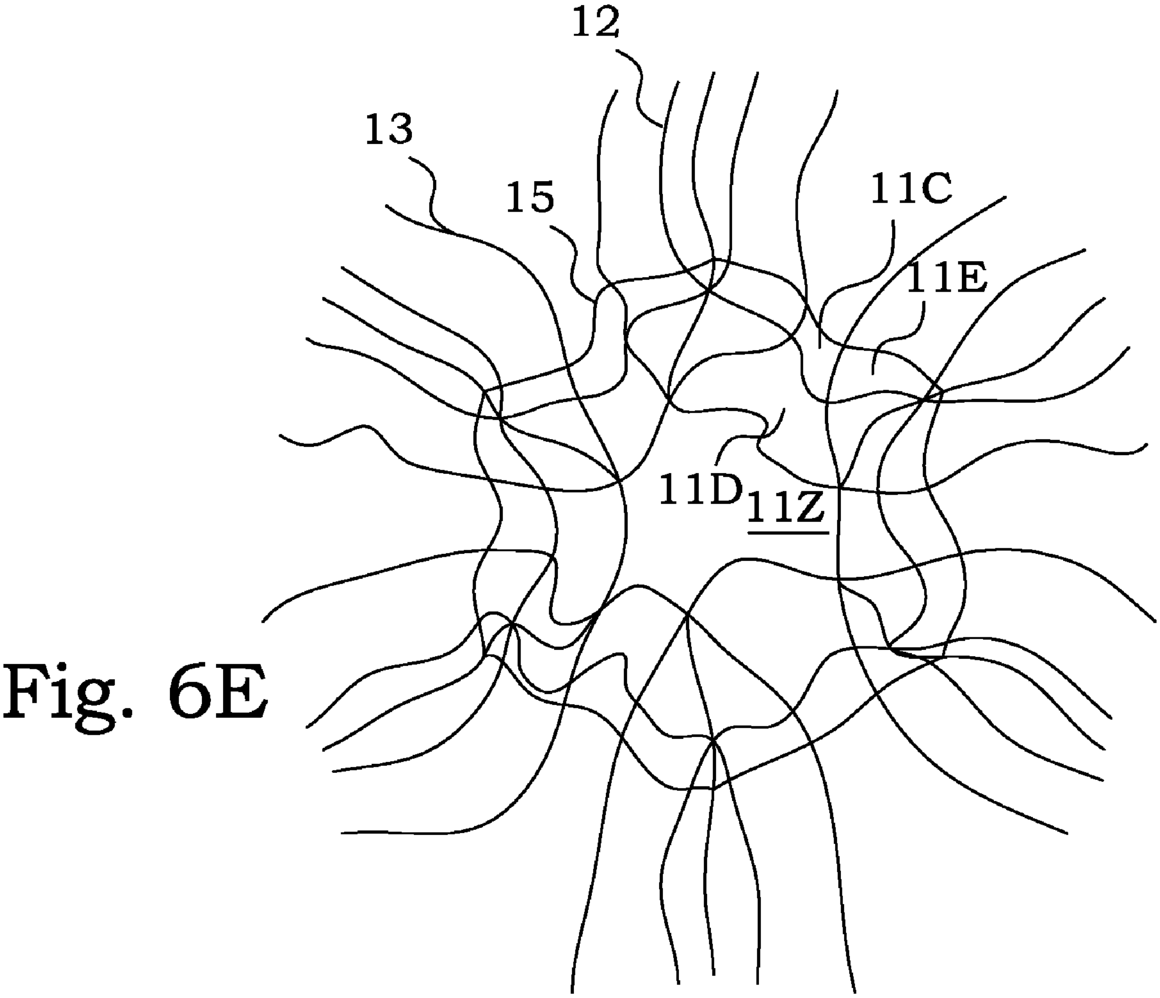

As mentioned above, the real situation is, however, not so ideal as the examples of FIGS. 6A-D may indicate. Instead, the borders 12, 13 are not easily determined and are typically non-circular. FIG. 6E illustrates a situation that could correspond to a real situation. Anyone skilled in the art then realises that any theoretical pre-determination of the areas 11, 11A-K, 11Z, is impossible in practice.

To further explain the various aspects of the present invention, a fairly detailed discussion of the current trends and solutions for position determination in cellular networks is provided below.

Figure 7:
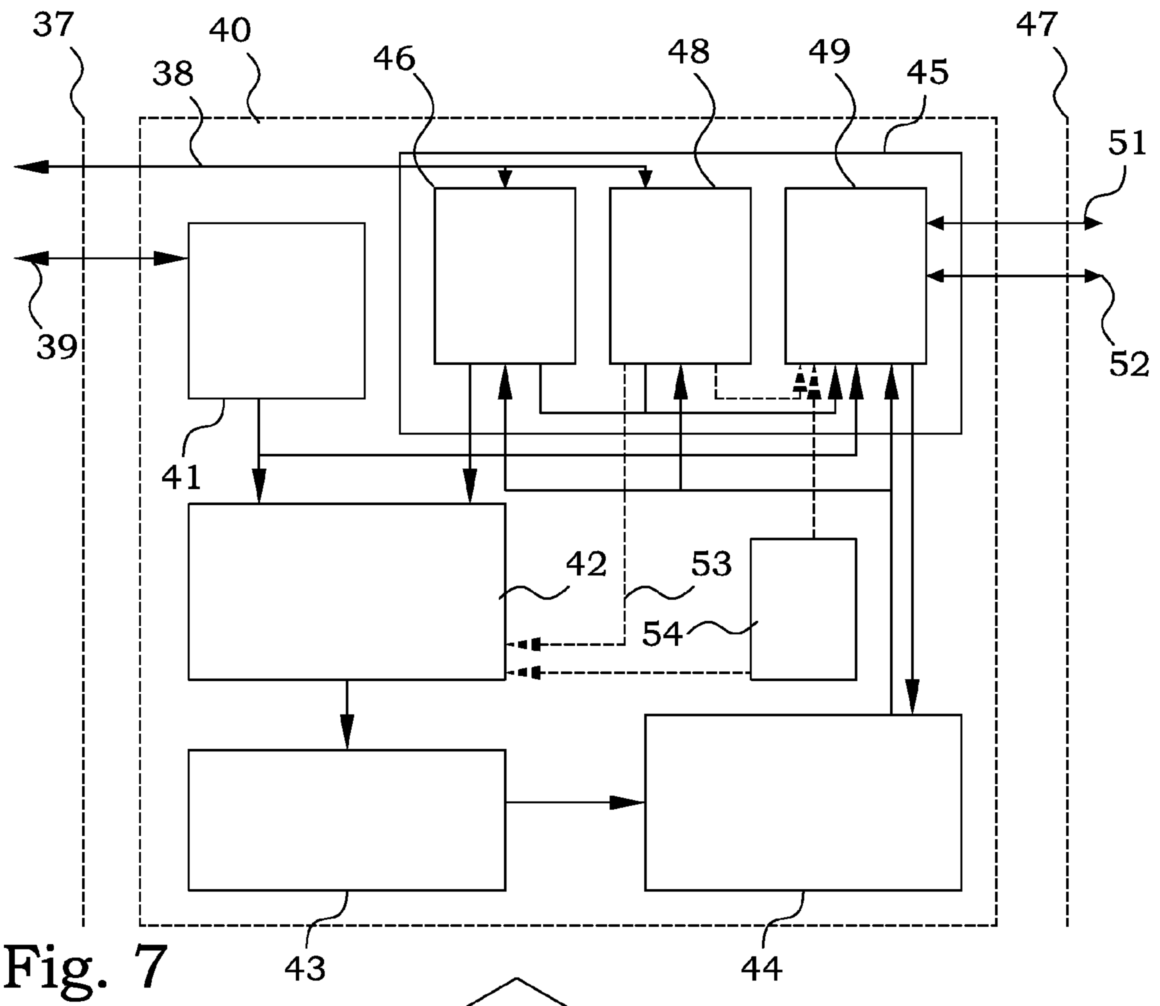
FIG. 7 is a block diagram of the main parts of an embodiment of prior art.
Figure 3:
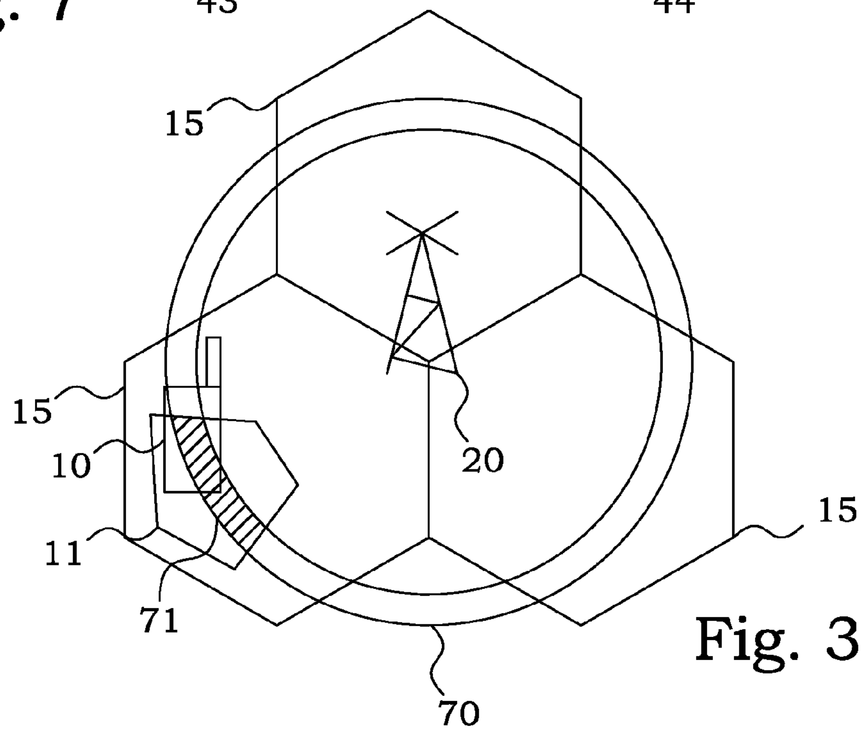
FIG. 3 is an illustration of MT measurements.
Figure 4:
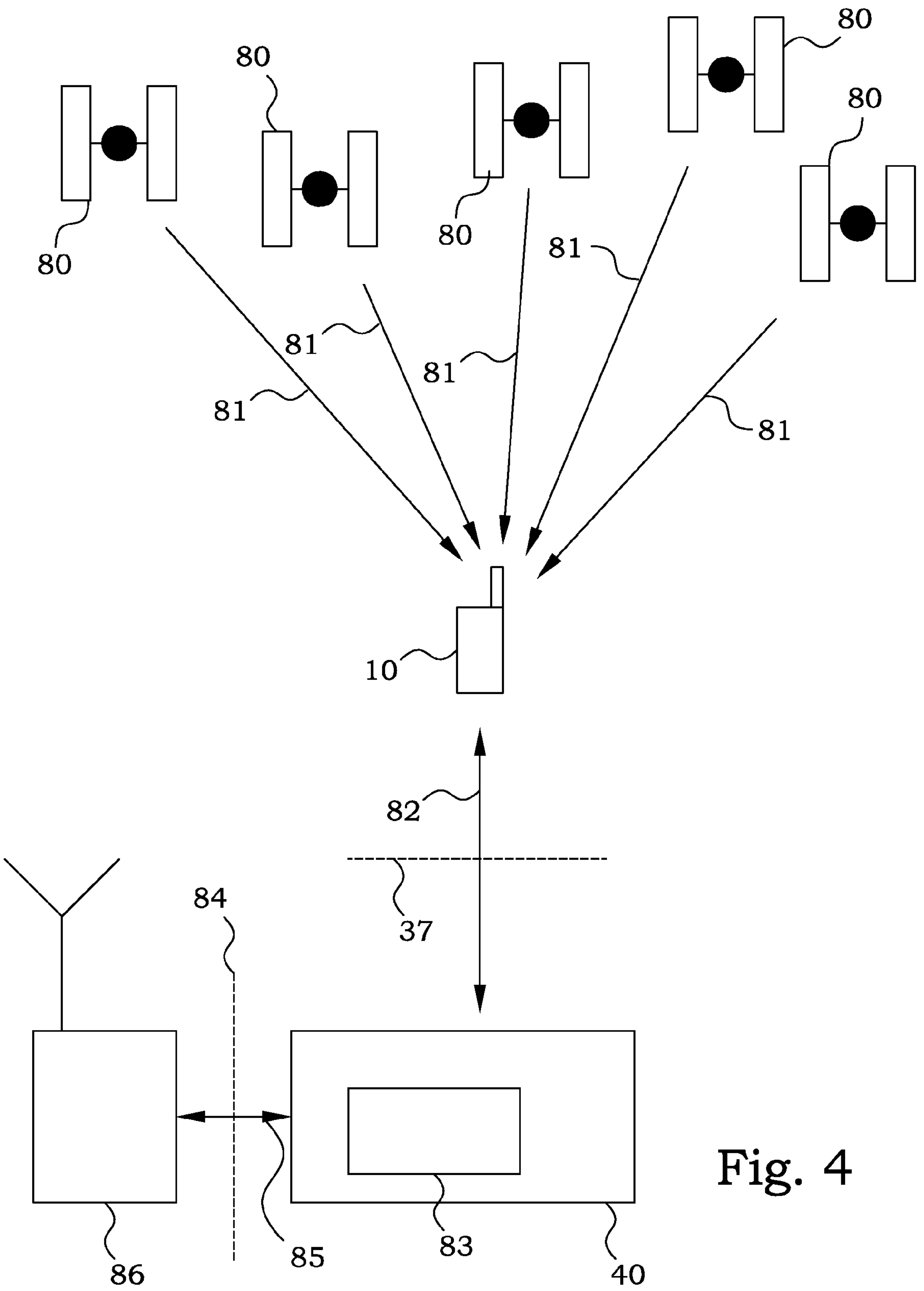
FIG. 4 is an illustration of A-GPS measurements.

One method of enhanced cell identity positioning is the so called Adaptive Enhanced Cell Identity (AECID) positioning method. A block diagram of the positioning method is depicted in FIG. 7. The AECID positioning algorithm is based on the previously described polygon format [1] and an algorithm for computation of a polygon, from a cluster of tagged high precision positioning measurements, see Appendix for further details.

The main steps of the AECID algorithm are:

1. Tagging of high precision position measurements (e.g. A-GPS measurements) with at least one of
   a. Cell Ids of detected cells
   b. Auxiliary connection information (e.g. RAB, time)
   c. Quantized auxiliary measurements (e.g. RTF or noise rise)
2. Collection of all high precision measurements with the same tag in high precision measurement clusters.
3. Calculation of a (tagged) polygon that contains a pre-specified fraction of said clustered high precision position measurements in the interior, thereby providing a polygon with known confidence value.
4. Storage of said tagged polygons in a database of polygons.
5. When an AECID positioning is to be performed, the following steps are performed:
   a. Determination of at least one of
      i. Cell Ids of detected cells
      ii. Auxiliary connection information (e.g. RAB, time)
      iii. Quantized auxiliary measurements (e.g. RTT or noise rise)
   b. Formation of the tag, defined by step a
   c. Retrieval of the polygon, corresponding to said tag
   d. Reporting of said polygon, over RANAP or PCAP.

The positioning reporting format defined by 3GPP [1] include:

1. Ellipsoid point
2. Ellipsoid point with uncertainty circle
3. Ellipsoid point with uncertainty ellipse
4. Polygon
5. Ellipsoid point with altitude
6. Ellipsoid point with altitude and uncertainty ellipsoid
7. Ellipsoid arc All formats are used in combination with the WGS 84 earth model [1]. The formats have the following properties:

The point format express the terminal position with a latitude and a longitude, possibly also including an altitude and uncertainty measure, The polygon format expresses the terminal position by a list of corner points, each expressed as a latitude and a longitude, said corner points forming a polygon in which the terminal is located.

The ellipsoid arc format is special and tailored for so-called RTT positioning (see below). The format expresses the terminal position by an arc of a certain thickness, with left and right angles.

The 3GPP positioning procedures over RANAP [2] and PCAP [3] are organized according to a single request—one reply configuration. It is also possible to set up periodic reporting procedures—however the common assumption in such cases is that the same positioning method is applied and that the response is of the same type, during the whole duration of the periodic positioning reporting period.

Furthermore, the selection of positioning method is closely tied to the geometry of the shape used for position reporting over RANAP [2] and PCAP [3]. Typically, the result of the cell ID positioning is reported by the use of a polygon t, whereas A-GPS reporting usually exploits one of several ellipsoid point formats. For emergency positioning in North America, the ellipsoid point with or without uncertainty circle and without altitude is preferred.

Position Data

In 3GPP release 5, the 'Position Data' information element container was introduced in the LOCATION REPORT message of RANAP [2]. A similar introduction followed in PCAP [3]. Basically, the 'Position Data' information element container, in particular at least one item of the 'Positioning Method and Usage' IE, allows reporting of which positioning method(s) that have been applied in the RNC or the SAS in order to arrive at the reported terminal position. The information element includes a number of reserved methods, like cell Id and A-GPS, as well as network specific positioning methods. The additional information carried by the 'Position Data' information element is the key pre-requisite for the present invention, which exploits said information to extend the reporting format capabilities over RANAP and PCAP.

One possible solution extends the positioning reporting functionality by a joint use of the 'Geographical Area' and 'Position Data' IE containers. For the present disclosure, the key observation is that this solution introduces the possibility of reporting multiple polygons, in response to one single LOCATION REPORTING CONTROL message over RANAP (location request). This feature will be important when the present invention is applied in hilly terrain.

Cell Polygons with Additional Altitude Information

There is currently no explicit support for cell polygons augmented with altitude information in the 3GPP standard. However, some ideas have been discussed, namely:

1) Enabling a reporting format [6], where altitude is augmented to each corner of the polygon format of [1].
2) Algorithms [7] for computation of the altitude information carried by the above mentioned reporting format.
3) The use of altitude information in the AECID algorithm, for augmenting resulting polygon corners with altitude information.
4) Means for reporting of polygons augmented with altitude information, within the 3GPP standard [2], [3].

The immediate needs and possibilities with regard to the present invention are provided by the bullets 2, 3 and 4 above, 1. is a more long-term solution.

Surface Modeling Using the Techniques of [7]

Figure 8A:
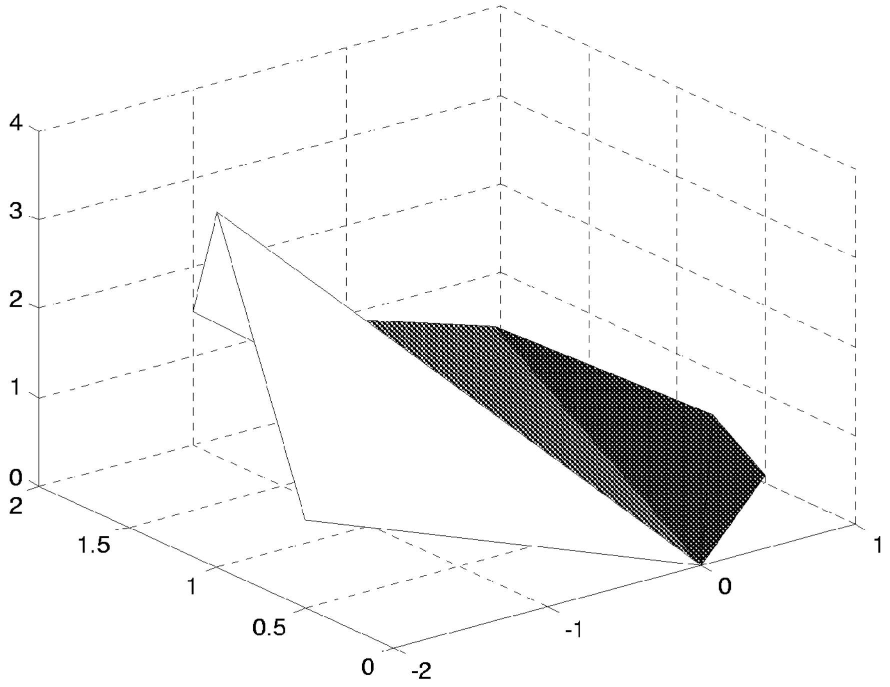
FIGS. 8A-B are illustrations of known interior altitude models.
Figure 8B:
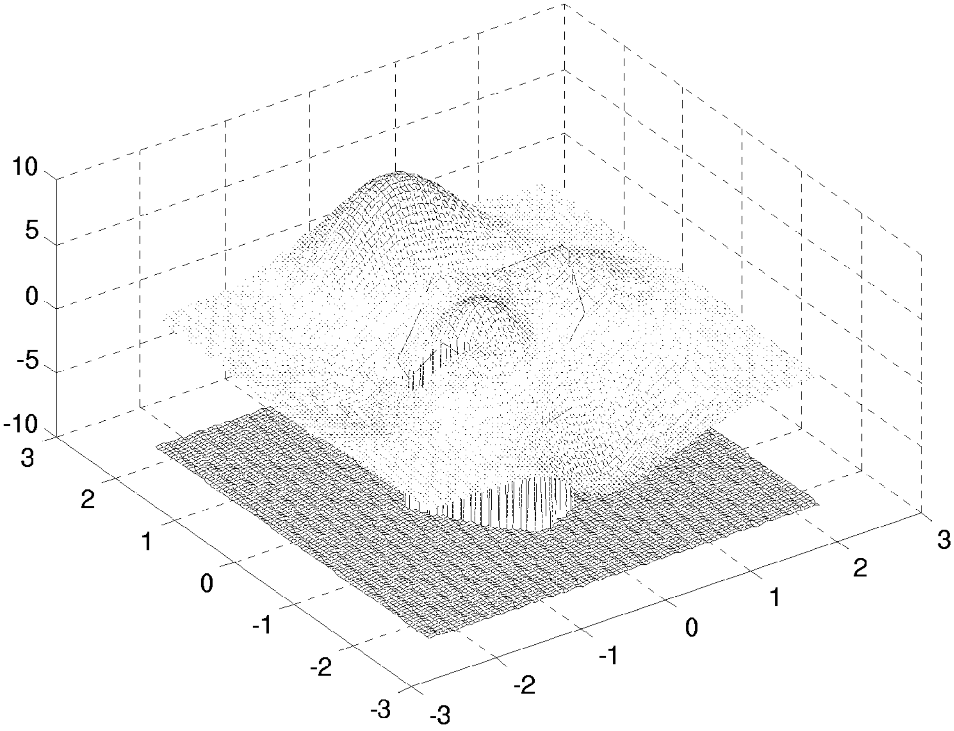

The disclosed techniques of [7] model the interior of a given polygon either by a piecewise linear model, or by polynomial models. Examples of the results of such modelling appear in FIG. 8A and FIG. 8B. FIG. 8A discloses a piecewise linear altitude model according to the techniques of [7]. FIG. 8B discloses an analytical polynomial interior altitude model and underlying data. The original surface, the resulting model, and the polygon are superimposed.

As is evident from the above discussion the interior altitude models obtained from [7] can be summarized as surfaces, i.e. functions $$h=h(x,y,\theta)\cdot(xy)^T\in\Omega \tag{1}$$

where x is the x-coordinate in a Cartesian coordinate system, y is the y-coordinate in the same Cartesian coordinate system and where θ are the altitude parameters associated with each of the corners of the region $\Omega\subset R^2$.

In [7], two modeling techniques are used. The first technique determines correct altitudes for the corners of the polygon, followed by derivation of an interior model. The other method uses altitude reference points, interior or at the boundary, to obtain parameters θ (not necessarily correct altitudes) that model all altitude reference points in an optimal way. See [7] for details.

AECID Altitude Augmentation

The altitude representation of the AECID method that has been disclosed so far is basic.

1) High precision position measurements, typically A-GPS position measurements, most often include an altitude. These altitudes become an integral part of the AECID clusters, after tagged clusters have been created.

2) Augmentation of altitude to each cell polygon corner, said polygon corners being computed with the shrinking polygon algorithm, by calculating the average altitude for points of a measurement cluster that are "close enough" to each one of the corners of the polygon. In this respect, the augmentation represents one way to obtain corner altitudes that can be used in order to derive a model like (1).

Problems with Existing Technology

The driving force behind the methods and arrangements of the present invention is not really problems with existing technology, but rather an insight that performance e.g. of the previously described cell ID and AECID algorithms can be significantly improved by means of the present disclosure.

The present invention is motivated by the lack of the following features in prior art:

1) Signaling means for transmission of a measured barometric pressure (altitude) from a cellular terminal to a node of a cellular radio network. This is a fact for the RRC interface [8] of the WCDMA system, as well as for similar interfaces in the GSM and CDMA 2000 cellular systems.
2) Signaling means for transmission of a calibration measurement of barometric pressure (altitude) from a node of a cellular communication system to cellular terminals of said system. Transmission using broadcast or using dedicated connection are possible. Typically, the RRC interface [8] would be used in the WCDMA cellular system.
3) Algorithms for computation of a restricted region (typically one or more polygons) that are consistent with altitude information obtained from a cellular terminal, said restricted region being smaller than the original polygon representing the terminal position using the cell ID or AECID positioning methods.

The Present Invention Generally Discloses

The core of a signalling protocol for signalling of barometric pressure (altitude), over the RRC protocol [8] (similar for non-WCDMA systems).

The core of a signalling protocol for signalling of calibration information for barometric pressure (altitude) measurements in cellular terminals, from a node of a cellular system.

Algorithms that enhances the accuracy of cell ID or AECID positioning, by restricting the calculated terminal position to regions of the cell polygon that are consistent with said barometric pressure (altitude) measurement.

The invention is further based on the recognition that barometric pressure transducers are appearing in the market that: have resolutions of 1/10 mbar (equivalent to 1 m), cf. e.g. [9], have accuracies better than 1 mbar (equivalent to 10 m) with calibration, are small enough to be integrated in pulse monitoring clocks, and are reasonably priced. These transducers are hence candidates for measuring altitude independently of GPS, in cellular phones.

Consequently, the present invention discloses (among other aspects):

1) Various techniques for transmitting information regarding the barometric pressure or, equivalently, an altitude, said barometric pressure being measured by a barometric pressure transducer in a cellular terminal.
2) Various techniques and arrangements for
   a. accurately measuring barometric pressure at reference locations (typically at RNCs or RBSs), thereby obtaining a calibration measurement accounting for the local barometric pressure.
   b. Transmission of said calibration measurement to cellular terminals.
3) a plurality of algorithms for restriction of a cell polygon, said cell polygon being augmented with altitude information, to regions of said cell polygon that are consistent with the measured barometric pressure (altitude), reported by said cellular terminal, thereby computing a new cell polygon of reduced geographical extension, as compared to the original cell polygon.

The general idea according to embodiments of the present invention is hence to use supporting barometric altitude measurements to narrow down the cell polygons that are typically used for conventional cell ID positioning [2], [3]. [8] as well as for AECID positioning [6]. It is expected that significant reduction in position uncertainty can be obtained for cells where the altitude varies by at least 5-10 meters. In mountain areas, the effect of combining cell polygons augmented with altitude, with barometric pressure measurements in terminals appears to offer accuracies similar to those obtained with RTT positioning, or even better. Note also that in hilly terrain a cell cluster may be split up into several distinct regions (altitude "islands"). A known technique can then be applied in order to split AECID clusters, whereas the previously mentioned solution of reporting multiple polygons at the same time can be used for reporting of the result. The invention of the present disclosure is particularly suitable for implementation using the AECID positioning method. In particular when combined with RTT positioning in hilly terrain, highly accurate positioning results should be within reach.

Figure 9:
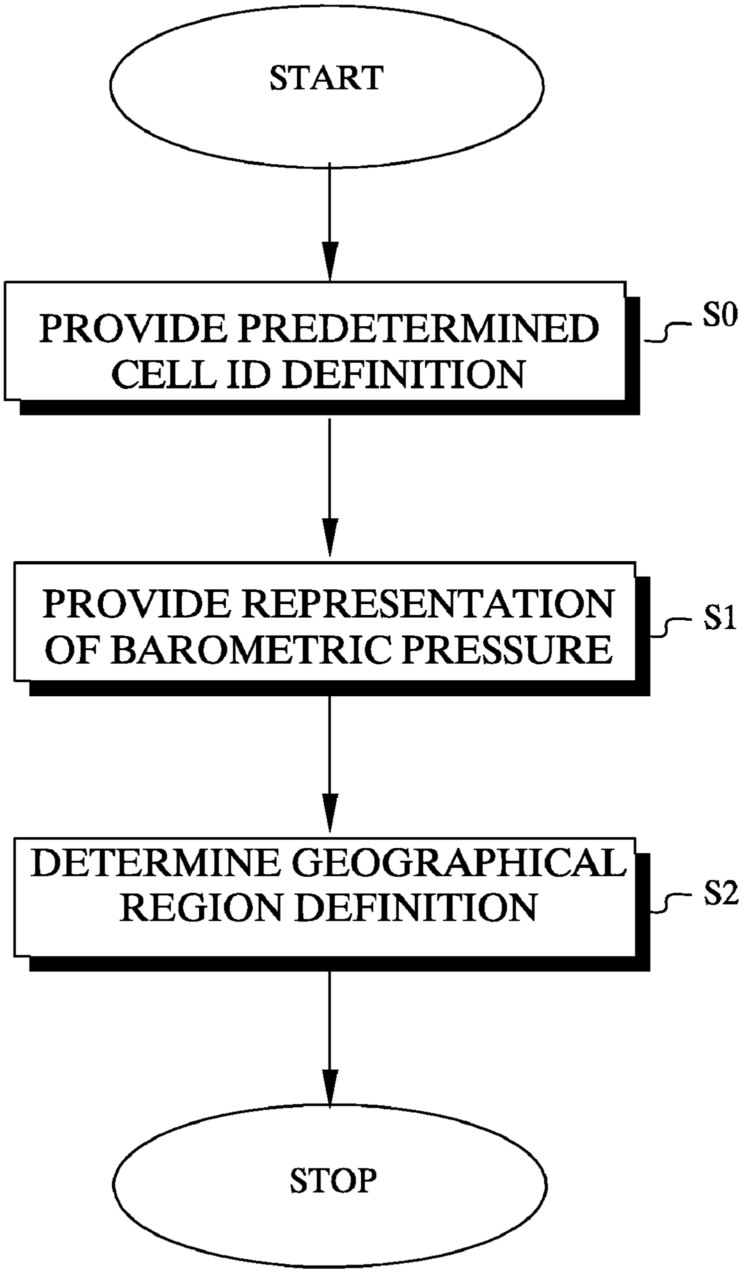
FIG. 9 is a flow diagram of the main steps of an embodiment of a method according to the present invention.

A general embodiment of a method of enhanced position determination of a user terminal associated with at least one cell in a cellular communication network according to the invention will be described with reference to the flow diagram of FIG. 9. Initially a predetermined cell identity definition is provided S0. Subsequently a representation of a barometric pressure measure for the user terminal is provided S1. The barometric pressure corresponds to an altitude for the user terminal. Based on the cell identity definition and the representation of the barometric pressure measure a geographical region definition is determined S2 for the user terminal. The geographical region definition corresponds to a horizontal or lateral region associated with the predetermined cell identity definition and the representation of the barometric pressure measure.

In more general terms, the horizontal region of the location of the user terminal is further restricted based on the altitude of the user terminal. The cell identity definition could for a specific embodiment comprise a cell area definition such as a map with elevation curves, and the geographical region definition comprises locating those areas of the cell identity definition that have elevation curves corresponding to the altitude of the user terminal. According to various embodiments, the geographical region definitions are obtainable by consideration of a predetermined map with altitude information.

In other words, for a specific embodiment, the predetermined cell identity definition comprises a predetermined cell area definition, such as a geographical cell area definition, and the determined geographical region definition comprises a new geographical cell area definition that is an area that is internal to the predetermined region. i.e. a restriction of the predetermined region.

According to a further embodiment, the representation of a barometric pressure measure comprises a measured altitude and a confidence interval, thus resulting in a maximum and a minimum altitude for the user terminal. For this case two geographical region definitions are determined, one corresponding to the maximum altitude and one corresponding to the minimum altitude. The two regions together define a closed geographical region or area in which the user terminal is located, e.g. an annular horizontal region.

A further embodiment of the present invention relates to improving the accuracy of the previously described AECID positioning algorithm. The embodiment comprises the afore mentioned steps of providing a predetermined cell identity definition, providing a representation of a barometric pressure measure and determining a geographical region definition based on the cell identity definition and barometric pressure measure representation. In addition a plurality of measurement clusters are provided. Those clusters typically include high precision horizontal position measures, each of which is associated with a certain tag. Each such tag reflects the provided representation of the barometric pressure measure and the predetermined cell identity definition.

The step of determining the geographical region definition then comprises determining a geographical region definition, which contains a pre-specified fraction of the high precision measurements of the cluster in its interior, and subsequently associating the determined geographical region definition with the tag of the specific cluster.

As mentioned earlier, the geographical region definition can be a cell area definition e.g. a polygon.

In direct correspondence with the previously described embodiment the representation of a barometric pressure measure can comprises a maximum and minimum threshold, thereby enabling determining two geographical region definitions e.g. polygons that together define a closed geographical region comprising the location of the terminal.

Additionally, a method according to the invention according to a specific embodiment comprises the steps of generating a tag based on the provided representation of the barometric pressure measure and the provided predetermined cell identity definition and determining the geographical region definition by retrieving a previously determined geographical region definition corresponding to the tag and finally representing the location of the user terminal with the retrieved geographical region.

Various aspects of the step of providing a representation of a barometric pressure measure will be further described below. In essence, the user terminal under consideration provides the representation of a barometric pressure measure. In its most simple form the user terminal measures a barometric pressure and reports that measure to the base station or some other node in the network. According to a specific embodiment, the user terminal converts the measured barometric pressure into an altitude that is reported. A further embodiment comprises performing a calibration step based on calibration measurements performed at a known location in the network.

Figure 10:
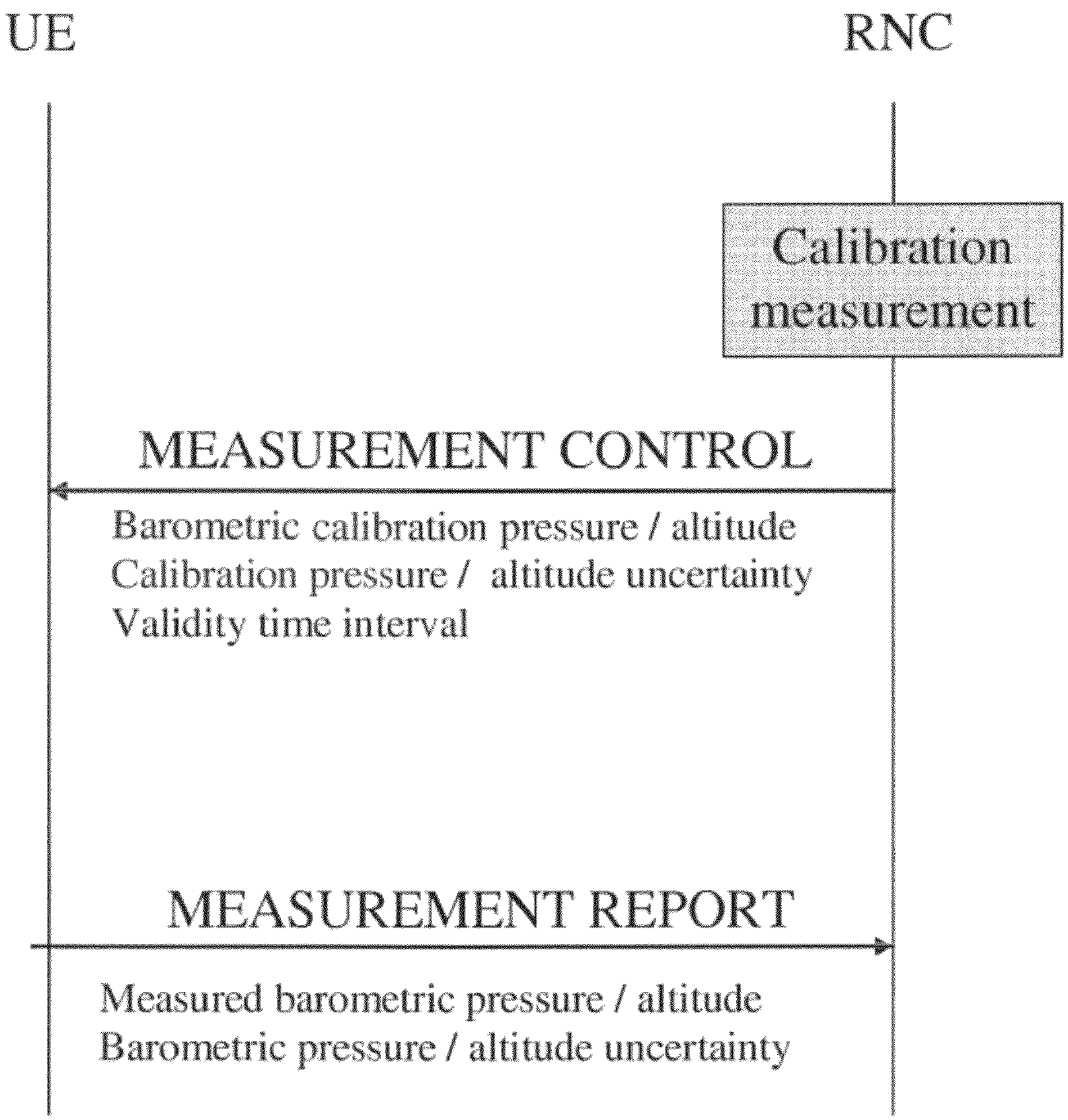
FIG. 10 is a schematic signalling scheme for embodiments of the present invention.

In WCDMA, the natural ways to implement the above mentioned and much needed signaling is by using the so-called MEASUREMENT CONTROL/MEASUREMENT REPORT messages. An alternative would be to use broadcast of calibration pressure. A basic signaling sequence appears in FIG. 10.

Signaling of Barometric Pressure (Altitude) Measurements

The signalling of measured barometric pressure can e.g. be performed by signalling of a suitable combination of the following information elements

- Discretized barometric pressure, typically measured in mbar. The range should cover at least +100 mbar-+1200 mbar with a resolution of 0.1 mbar.
- Discretized barometric pressure uncertainty, typically measured in mbar. The range should cover at least 0 mbar-500 mbar with a resolution of 0.1 mbar.
- Discretized barometric pressure, transformed to altitude in the terminal. The range should cover at least −1000 m-+30000 m with a resolution of 1 m.
- Discretized altitude uncertainty. The range should cover at least 0 m-+5000 m with a resolution of 1 m.

Difference measurements with regard to calibration pressure/altitude are also possible, with obvious differences in ranges.

It should be noted that before the signaling above can take place, recent enough, pressure calibration needs to be available in the user terminal.

Signaling of Barometric Pressure (Altitude) Calibration Information

The signalling of barometric pressure calibration information can e.g. be performed by signalling of a suitable combination of the following information elements

- Discretized barometric calibration pressure, typically measured in mbar. The range should cover at least +500 mbar-+1200 mbar with a resolution and accuracy of 0.1 mbar.
- Discretized barometric calibration pressure uncertainty, typically measured in mbar. The range should cover at least 0 mbar-100 mbar with a resolution of 0.1 mbar.
- Discretized barometric calibration pressure, transformed to altitude in the terminal. The range should cover at least −1000 m-+5000 m with a resolution and accuracy of 1 m.
- Discretized altitude calibration uncertainty. The range should cover at least 0 m-+1000 m with a resolution of 1 m.
- Validity time interval. The range should cover at least 1 minute-12 hours with a resolution of 1 minute.

It is recognized that the validity range can be controlled in the transmitting node. The reason is that e.g. the RNC has access to the geographical cell data for its cells. Hence, calibration information is sent to the cells where the particular instance of this calibration information is valid.

Enhancement of Positioning Accuracy, Using Altitude Derived from Barometric Pressure Measurements In this subsection, the principles for restriction of the lateral region of a cell polygon, using altitude information, are outlined and illustrated.

Pressure to Altitude Transformation

In case the signalled quantity needs to be transformed between barometric pressure and altitude, the following formula can be used $$p = p_{MeanSeaLevel}e^{-kh} \Leftrightarrow h = \frac{\ln(p_{MeanSeaLevel}) - \ln(p)}{k} \quad (2)$$

A more advanced alternative would be to use meteorologically generated tables of the pressure as a function of the altitude. The constant k is readily available form meteorological tables, or can be determined from reference measurements.

Calibrated Measurement Procedures

Three main calibration cases need to be covered. The first and second ones assume that the main source of calibration error is due to meteorological pressure variations. The third case also considers drifts in the pressure transducer of the terminal.

Calibration of Natural Meteorological Pressure Variations—Altitude Reported from Terminal This calibration needs to be performed at least as fast as the natural pressure variations in the atmosphere. Since these variations are sometimes fast. e.g. when strong low-pressure systems are passing, it is important to:

1) Perform calibration frequently, and signal new values to the terminal frequently enough. Typically, whenever a new barometric pressure measurement is performed, or when new calibration measurements becomes necessary.
2) Stating the period of time (validity time interval), during which the calibration pressure (altitude) is valid with the indicated accuracy.

The calibration procedure described here assumes that the terminal is aware of the normal pressure at mean sea level (1013 mbar at altitude 0 m).

After receiving a MEASUREMENT CONTROL message (or broadcast information), carrying calibration information the user terminal needs to 1) Calculate $$\Delta p_{Meteorological} = p_{Calibration} - p_{MeanSeaLevel} \tag{3}$$

$$T_{pCalibrationExpires} = t + T_{pCalibration}, \tag{4}$$

where $\Delta p_{Meteorological}$ denotes the current barometric correction, $p_{Calibration}$ denotes the calibrating pressure at mean sea level, $p_{MeanSeaLevel}$ denotes the standard pressure at mean sea level. $T_{pCalibrationExpires}$ denotes the terminal time when the accuracy of the calibration is no longer valid (new calibration information is needed), t denotes the time of the terminal and $T_{pCalibration}$ is the validity time interval of the current pressure calibration.

2) Store $$\Delta p_{Meteorological}$$

$$\sigma_{pCalibration}$$

$$T_{pCaLbrationExpires}, \tag{5}$$

where $\sigma_{pCalibration}$ is the inaccuracy of the present calibration, said inaccuracy being valid until $T_{pCalibrationExpires}$.

Whenever the terminal performs a barometric pressure measurement it additionally needs to 3) Check if $t < T_{pCalibrationExpires}$ a. If true calculate $$p_{CalibratedMeasurement} = p_{Measurement} + \Delta p_{Meteorological} \tag{6}$$

$$\sigma_{CalibratedMeasurement} = \sqrt{\sigma^2_{Measurement} + \sigma^2_{pCalibration}}, \tag{7}$$

where $P_{CalibratedMeasurement}$ denotes the calibrated measurement, $p_{Measurement}$ denotes the barometric pressure measurement, $\sigma_{CalibratedMeasurement}$ denotes the calibrated uncertainty, $\sigma_{Measurement}$ denotes the (probably pre-stored) measurement uncertainty of the barometric pressure transducer of the terminal.

b. Otherwise request or await new calibration information.

4) Calculate $$h_{CalibratedMeasurement} = \frac{\ln(p_{MeanSeaLevel}) - \ln(p_{CalibratedMeasurement})}{k} \tag{8}$$

$$\sigma_{hCalibratedMeasurement} = \frac{\sigma_{pMeasurement}}{kp_{CalibratedMeasurement}}, \tag{9}$$

where $h_{CalibratedMeasurement}$ is the altitude to report, $\sigma_{hCalibratedMeasurement}$ denotes the inaccuracy to report and $\sigma_{pMeasurement}$ denotes the measurement uncertainty of the pressure transducer. (9) follows by differentiation of (8).

5) Discretize $h_{CalibratedMeasurement}$ and $\sigma_{CalibratedMeasurement}$.
6) Report $h_{CalibratedMeasurement}$ and $\sigma_{pCalibratedMeasurement}$ a MEASUREMENT REPORT message.

Calibration of Natural Meteorological Pressure Variations—Pressure Reported from Terminal In this case, it is enough for the terminal to perform measurements, discretize the measurements and report the discretized measurements. The calibration can be performed in the positioning node. The details are similar to the above described procedure.

Pressure Transducer Calibration

In order to perform this calibration the terminal needs to be located at well defined altitude $h_{Reference}$. The procedure described previously is then repeated. It then follows that the individual calibration error can be calculated as $$p_{TransducerError} = p_{Measurement} - p_{Calibration} - p_{Calibration} e^{kh_{Reference}}. \tag{10}$$

A few specific examples of embodiments according to the present invention will be described below.

Based on a reported altitude $h_{Calibratedmeasurement}$ and uncertainty $\sigma_{hCalibratedMeasurement}$, minimum and maximum altitudes are calculated according to $$h_{min} = h_{CalibratedMeasurement} - \sigma_{hCalibratedMeasurement} \tag{11}$$

$$h_{min} = h_{CalibratedMeasurement} - \sigma_{hCalibratedMeasurement}. \tag{12}$$

In case barometric pressure measurements are reported Equations (11) and (12) are preceded by $$h_{CalibratedMeasurement} = \frac{\ln(p_{MeanSeaLevel}) - \ln(p_{CalibratedMeasurement})}{k} \tag{13}$$

$$\sigma_{hCalibratedMeasurement} = \frac{\sigma_{pMeasurement}}{kp_{calibratedMeasurement}}. \tag{14}$$

where $p_{MeanSeaLevel}$ is a calibration barometric pressure measurement performed at a known location at sea level, and $p_{CalibratedMeasurement}$ is the calibrated barometric pressure measurement from the user equipment.

Using Equation (1) a set of level curves can then be implicitly calculated as $$h(x_{min}^l, y_{min}^l, \theta) = h_{min}, (x_{min}^l(\theta) y_{min}^l(\theta)) \in \Omega, l = 1, \ldots, l_{max} \tag{15}$$

$$h(x_{max}^l, y_{max}^l, \theta) = h_{max}, (x_{min}^l(\theta) y_{min}^l(\theta)) \in \Omega, l = 1, \ldots, l_{max} \tag{16}$$

where l correspond to the specific interval of quantized measurements. It is physically clear that the level curve represented by (15) for a specific $l_a$ is completely enclosed in the region defined by the level curve (16), in case (16) is closed (Mountains normally have smaller horizontal cross sections higher up). In such cases, the terminal must be located in the region in between the minimum and maximum level curves. By solving (15) for a number of points, an outer polygon can be found. By solving (16) for a number of points, an inner polygon can be found. These two polygons can be reported over RANAP or PCAP using a previously mentioned solution.

It is clear that for a specific model, represented by θ, there are normally more cases to consider, cases that do not necessarily render closed curves in the interior of a polygon. Hence, also the boundary of the polygon needs to be invoked when inner and outer polygons are determined. This can be fairly complicated—the details are omitted.

An example of AECID positioning using barometric pressure according to an embodiment of the present invention will be described below.

The previously described AECID positioning method automatically provides a way to characterize regions bounded by level curves and cell boundaries.

The prerequisites are that the AECID positioning method is set up allowing high precision measurements (typically A-GPS) with altitude information. In addition, that the representation of the barometric pressure measure, e.g. the barometric altitude is defined as a quantized auxiliary measurement.

The procedure according to the invention is then as follows.

1) AECID is run as usual. Measurement clusters, tagged with at least cell Ids and quantized barometric altitude are automatically built up and stored.
2) When polygons are to be computed it is evident that sometimes measurement clusters with holes need to be processed. This is done with the following procedure that is novel to AECID.
   a. A minimum altitude polygon is calculated from a cluster consisting of the union of all clusters characterized by the cell ID and $h_{QuantizedBarometricAltitude} \geqq h_{QuantizedMin}$. Note that $h_{QuantizedMin}$ is equal to the barometric altitude quantization level that is closest below $h_{min}$ of (11).
   b. A maximum altitude polygon is calculated from a cluster consisting of the union of all clusters characterized by the cell ID and $h_{QuantizedBarometricAltitude} \geqq h_{QuantizedMax}$. Note that $h_{QuantizedMin}$ is equal to the barometric altitude quantization level that is closest below $h_{max}$ (11).

The two resulting polygons are then typically reported in one message.

Sometimes multiple regions (multiple hills) arise in the step above—however with the basic tagging they end up in the same cluster. A known solution solves this problem by providing means for splitting of clusters with several "centers", into separate clusters.

The embodiments above are to be understood as a few illustrative example of the present invention. It will be understood by those skilled in the art that various modifications, combinations, and changes may be made to the embodiments of the present invention without departure from the scope thereof. In particular, different part solutions in the different embodiments can be combined in other configurations, where technically possible. The scope of the present invention is however defined by the appended claims.

REFERENCES

[1] 3GPP, TS 23.032, "*Universal Geographical Area Description* (*GAD*)", available at http://www.3gpp.org.

[2] 3GPP, TS25.413, "*UTRAN Iu interface RANAP signalling*", available at http://www.3gpp.org.

[3] 3GPP TS 25.453, '*UTRAN Iupc interface Position Calculation Application Part* (*PCAP*) *signalling*', available at http://www.3gpp.org.

[4] E. D. Kaplan. *Understanding GPS—Principles and Applications*. Norwood, Mass.: Artech House. 1996.

[5] A. Kangas and T. Wigren, "*Location coverage and sensitivity with A-GPS*", URSI EMP-S, Pisa. Italy, May 2004.

[6] T. Wigren and A. Lundqvist, "*Altitude information in cell ID polygonial reporting format*", U.S. patent application U.S. Ser. No. 10/146,463, May 16, 2002.

[7] T. Wigren. "*Altitude compensation in OTDOA positioning*", U.S. patent application Ser. No. 10/146,126, May 16, 2002.

[8] 3GPP TS 25.331, "*RRC protocol specification*", available at http://www.3gpp.org.

[9] www.polarusa.com/Products/consumer/axn500.asp

APPENDIX A

The main parts of the presently preferred embodiment of the present invention are described in detail in this appendix.

Clustering

In this particular embodiment, it is assumed that the cell relation configuration is based on the active list of cells, i.e. cells active in soft handover. Corresponding modelling is possible also for other cluster selection rules.

The high-precision position measurements are typically obtained expressed in the WGS 84 geographical reference system. The measurements that are available at time t are denoted $$(lat_j(t_j) long_j(t_j))^T, j=1, \ldots, N(t) \quad \text{(A1)}$$

where $lat_j(t_j)$ and $long_j(t_j)$ denote the measured latitude and longitude, respectively, at the time $t_j$. N(t) denotes the total number of available measurements at time t. $(\ )^T$ denotes matrix/vector transpose.

At the same time $t_j$ (to within some reasonable accuracy in time), the cell relation configuration is sampled for cell identities. The result is the row vector (or pointer)

$$\text{Configuration}(t_j)=(cID_1(t_j) cID_2(t_j) \ldots cID_{N(t_j)}(t_j)). \quad \text{(A2)}$$

where $cID_1(t_j)$ is the cell identity of the l:th strongest cell in e.g. softer handover, for the UE for which high-precision positioning was performed at time $t_j$. $N(t_j)$ is the number of cells in the cell relation configuration at time $t_j$.

An arbitrary possible pointer used for clustering of measurements, defined according to (A2), is now denoted by $$\text{Pointer}_k=(\text{Index}_l(k) \ldots \text{Index}_{N(k)}(k)), k=1, \ldots, K \quad \text{(A3)}$$

where $index_l(k)$ is the l:th component of the (fix) pointer k,N(k) is the dimension of the pointer k and K is the number of counters. The corresponding list of high-precision position measurements is denoted by $List_k$. At time t:

$$List_k(t) = \begin{pmatrix} lat_{k,1}(t_{k,1}) & lat_{k,2}(t_{k,2}) & \ldots & lat_{k,M(k,t)}(t_{k,M(k,t)}) \\ long_{k,1}(t_{k,1}) & long_{k,2}(t_{k,2}) & \ldots & long_{k,M(k,t)}(t_{k,M(k,t)}) \\ t_{k,1} & t_{k,2} & \ldots & t_{k,M(k,t)} \end{pmatrix}, \quad \text{(A4)}$$

where M(k,t) denotes the number of high-precision measurements of list k at time t. As stated above, measurements that are older than a pre-specified threshold are discarded from each list. The maximum size of a list can also be pre-specified, in which case the oldest measurement is discarded irrespective of its age when a new measurement arrives.

When a new high-precision measurement and corresponding cell relation configuration is obtained at time $t_{N(t)+1}$ the clustering algorithm operates as follows:

For k = 1 to K

If $\text{Pointer}_k = \text{Configuration}(t_{N(k)+1})$ $$\text{List}_k(t_{N(k)+1}) = \left( \text{List}_k(t) \begin{pmatrix} lat_{N(t)+1}(t_{N(t)+1}) \\ long_{N(t)+1}(t_{N(t)+1}) \\ t_{N(t)+1} \end{pmatrix} \right)$$

end

-continued

```
        else
                do nothing
        end
end
```

Polygon Computation

Notation

In order to facilitate an effective algorithmic description, the following notation is needed:

$p=(p_1 \ldots p_N)$—one specific pointer, corresponding to a specific cell relation configuration.

$r_{i,ll}^{p}=(x_{i,ll}^{p}\ y_{i,ll}^{p})^T$, i=1, . . . , $N_p$—the polygon corners corresponding to the cell relation configuration p in WGS 84 latitude longitude notation.

$r_i^p=(x_i^p\ y_i^p)^T$, i=1, . . . , $N_p$—the polygon corners corresponding to the cell relation configuration p in a local earth tangential Cartesian coordinate system, with the origin somewhere in the coverage area of the cellular system. Coordinate axes are usually east and north, disregarding the altitude.

$r_{j,ll}^{m,p}=(x_{j,ll}^{m,p}\ y_{j,ll}^{m,p})$, j=1, . . . , $N_p^m$—the high-precision measurements used in order to determine the corners of the polygon corresponding to the cell relation configuration p. Note that this measurements corresponds to one of the entries of $List_k$ that corresponds to p.

$r_j^{m,p}=(x_j^{m,p}\ y_j^{m,p})$, j=1, . . . , $N_p^m$—the high-precision measurements used in order to determine the corners of the polygon corresponding to the cell relation configuration p. The high-precision measurements are transformed to the same local earth tangential Cartesian coordinate system, with the origin somewhere in the coverage area of the cellular system, which is used above.

$C^p$—The specified confidence of the polygon corresponding to p. This value corresponds to the probability that the UE is located within the polygon, when the cell relation configuration corresponds to p.

$A^p$—The area of the polygon corresponding to p.

$P^p$—The region defined by the polygon.

Coordinate Transformations

The procedure starts by a transformation of all high-precision measurements corresponding to p to the local earth tangential Cartesian coordinate system, in which all computations are performed. Only the new measurements, which have not already been transformed need to be processed.

Constrained Cell Area Minimization Problem

The principle behind the computation of the polygon is governed by the following three ideas.

The area of the polygon should be as small as possible, thereby maximizing the accuracy.

The constraint of the confidence value should be maintained, for the high-precision measurements available.

Basic geometrical constraints on the polygon should be maintained, in particular the requirement that the polygon should not be allowed to intersect itself, and that the last numbered corner point is connected to the first (closeness).

The following minimization problem can then be set up for the computation of the corners of the polygon:

$$\{\hat{r}_1^p \ldots ,\hat{r}_{N_p}^p\} = \underset{r_1^p, \ldots ,r_{N_p}^p}{\operatorname{argmin}}\ A^p(r_1^p \ldots ,r_{N_p}^p) \tag{A5a}$$

subject to polygonal geometric constraints and $$\sum_{\substack{j=1 \\ r_j^{m,p}\in P^p}}^{N_p^m} 1 \ge C^p N_p^m. \tag{A5c}$$

This is a Nonlinear Optimization Problem. Many Methods that May be applicable to the solution of (A5a-c), have been developed over the years.

In the following, a new algorithm is disclosed, that instead is based on a direct approach, adapted to the problem at hand. Note that this method may not solve (A5a-c) exactly, however, it is based on the same ideas as (A5a-c) but in a stepwise manner.

Shrinking Polygon Algorithm

The main idea of this algorithm is to start with an initial polygon that contains all the high-precision measurements collected for the particular cell relation configuration. The initial polygon can e.g. be calculated from the centre of gravity of the high-precision measurements, followed by a calculation of the maximum distance from this centre of gravity, for all high-precision measurements. This defines a circle that contains all high-precision measurement points. The initial polygon is then selected to contain this circle.

Following this initial step, the area of the polygon is then reduced in steps, by movement of one selected corner point of the polygon inwards towards the momentary centre of gravity, so that one high-precision measurement point is eliminated from the interior of the polygon, for each step. The area reduction is performed so that the area reduction, at each step, is maximized over all corner points, at the same time as the constraints are maintained fulfilled.

Centre of Gravity

Since the high-precision measurements are treated as points (non-stochastic), the centre of gravity is the arithmetic mean, i.e.

$$r_{CG} = (x_{CG}\quad y_{CG}) = \frac{1}{N_p^{m,rem}} \sum_{q=1}^{N_p^{m,rem}} (x_q^{m,p,rem}\quad y_q^{m,p,rem})^T. \tag{A6}$$

where the superscript $^{rem}$ indicates high-precision measurements that have not yet been removed from the interior of the shrinking polygon by the shrinking polygon algorithm.

Initiation

Since the initiation of the algorithm only affects the $N_p$ first steps of the algorithm, a conservative approach is taken here. The first step is to compute the maximum distance from the centre of gravity, i.e.

$$j_{max}^p = \max_j \sqrt{(x_j^{m,p} - x_{CG})^2 + (y_j^{m,p} - y_{CG})^2} \tag{A7}$$

$$r^p = \sqrt{(x_j^{m,p} - x_{CG})^2 + (y_j^{m,p} - y_{CG})^2}\,. \tag{A8}$$

Hence all high-precision measurements are now within a distance $r^p$ of the centre of gravity. Note that if a finite number of polygon corner points would be spread out around this circle, there is no guarantee that the polygon contains all high-precision measurement points.

Figure 11:
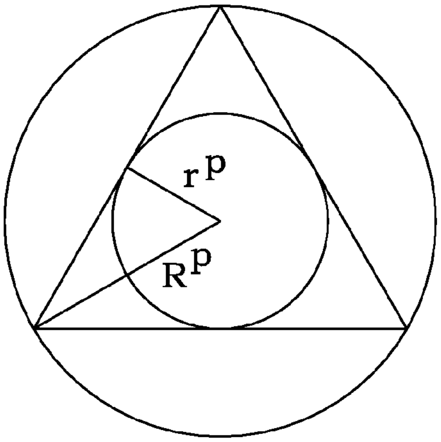
FIG. 11 is an in illustration of an initial geometry for a shrinking polygon method.

Since initial points, symmetrically spread around a circle, is attractive, an additional outer circle is determined, such that it contains the simplest polygon with three corners that contains the circle with radius $r^p$, see FIG. 11. The initial polygon corner points can then be spread out around this outer circle with radius $R^p$. It is geometrically obvious that the largest outer circle is obtained for a polygon defined by the minimum amount of corners, 3.

The outer radius can now be related to the computed inner radius by consideration of FIG. 11. Geometrical symmetry shows that $$R^p = \frac{r^p}{\sin(30)} = 2r^p. \tag{A9}$$

The initial polygon corner points $\{r_i^{p,0}\}_{i=1}^{N_p}$ can then be distributed around the outer circle according to $$x_i^{p,0} = x_{CG} + R^p\cos\left(360\frac{(i-1)}{N_p}\right) \tag{A10}$$

$$y_i^{p,0} = y_{CG} + R^p\sin\left(360\frac{(i-1)}{N_p}\right). \tag{A11}$$

Other strategies are of course also possible.

Maximum Corner Movement

Note that the computations described in this subsection consider high-precision measurement points the remains in the interior of the shrinking polygon, at each iteration step. This is true for (A12)-(A21) and for (A24)-(A26), see below.

Movement with Respect to High-Precision Measurement Points

In order to assess which polygon corner that is most beneficial to move inwards at a given iteration step, it is first necessary to determine what the maximum movement is. This needs to take two constraints into account.

The second high-precision point that leaves the polygon when a specific corner point is moved inward along the specified direction towards the centre of gravity constrains the movement inwards. This requires a search over all high-precision measurement points that remain inside the polygon at the specific iteration step of the algorithm.

The first polygon line segment that is intersected when a specific corner point is moved inward along the specified direction towards the centre of gravity constrains the move inwards. This requires a search over all line segments (between polygon corner points) of the polygon.

Both these constraints need to be checked. Together they determine the inward maximum movement.

Figure 12:
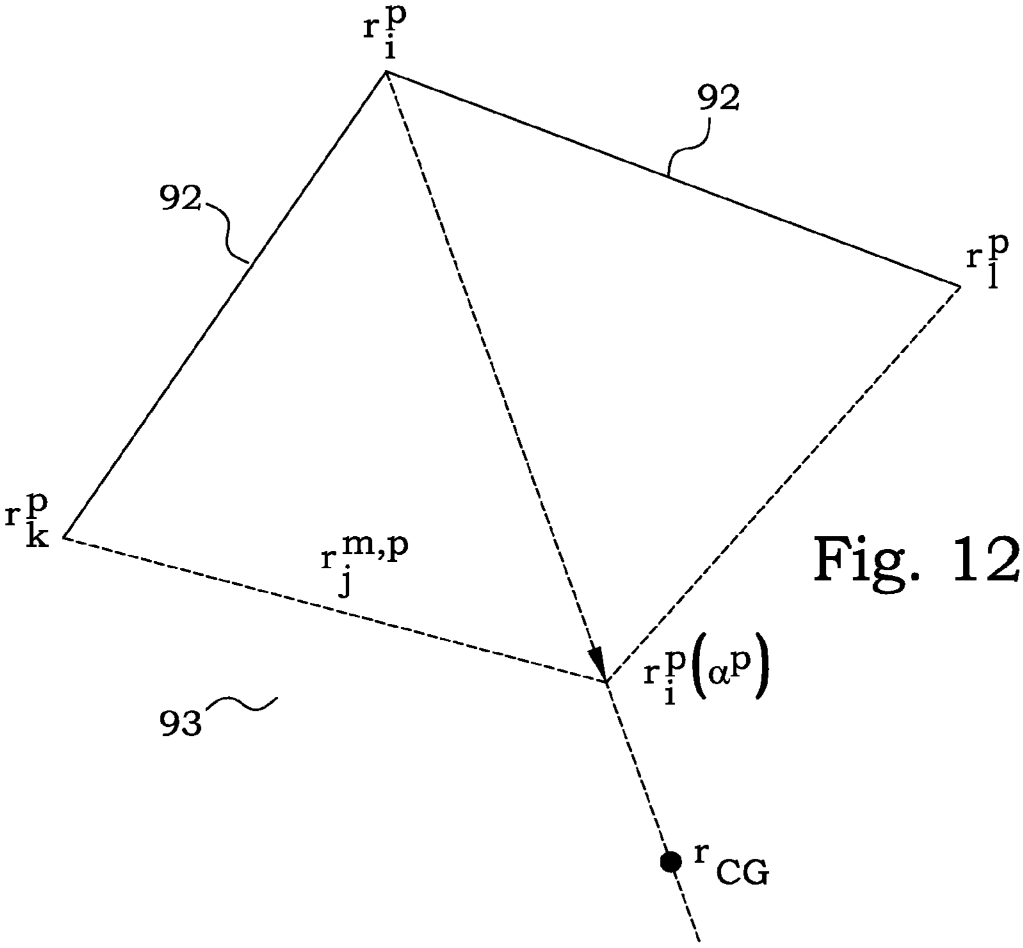
FIG. 12 is an illustration of the geometry used for determining a maximum polygon corner movement.

The maximum polygon corner movement with respect to a specific high-precision measurement point can be determined as follows, referring to FIG. 12. That figure shows a situation with three adjacent polygon corners $r_k^p$, $r_i^p$, $r_l^p$. The arbitrary numbering is due to the need to cover up for the fact that the last and the first of the polygon corner points are connected.

The middle point $r_i^p$ is then moved inwards towards the centre of gravity, i.e. into the interior 93 of the polygon. As a consequence the line segments 92 that connect $r_k^p$ and $r_i^p$, as well as $r_i^p$ and $r_l^p$ also move. At some point of the movement the considered high-precision measurement point may be intersected by either of these two line segments—both needs to be checked.

In order to determine a tentative point of intersection the movement of $r_i^p$ is computed to be $$r_i^p(\alpha^p) = r_i^p + \alpha^p(r_{CG} - r_i^p) \tag{A12}$$

Here $\alpha^p$ is a scalar parameter that varies between 0 and 1 when $r_i^p(\alpha)$ moves between $r_i^p$ and $r_{CG}$. Note that this is a standard way to describe a line segment mathematically. Note also that movement may in this case extend beyond the centre of gravity.

A necessary (but not sufficient) requirement for an intersection of the moving boundary of the polygon with the considered high-precision measurement point, is that $r_i^p(\alpha^p)-r_k^p$ and $r_j^{m,p}-r_k^p$ become parallel, or that $r_i^p(\alpha^p)-r_l^p$ and $r_j^{m,p}-r_l^p$ become parallel. Exploiting the fact that the cross product between parallel vectors is zero, allows for a computation of $\alpha^p$. Straightforward algebra gives the results:

$$\alpha_{ik}^{j,p} = \frac{-(x_i^p - x_k^p)(y_j^{m,p} - y_k^p) + (x_j^{m,p} - x_k^p)(y_i^p - y_k^p)}{(x_{CG} - x_i^p)(y_j^{m,p} - y_k^p) - (x_j^{m,p} - x_k^p)(y_{CG} - y_i^p)} \tag{A13}$$

$$\alpha_{il}^{j,p} = \frac{-(x_i^p - x_l^p)(y_j^{m,p} - y_l^p) + (x_j^{m,p} - x_l^p)(y_i^p - y_l^p)}{(x_{CG} - x_i^p)(y_j^{m,p} - y_l^p) - (x_j^{m,p} - x_l^p)(y_{CG} - y_i^p)}. \tag{A14}$$

The subscripts indicate the polygon corner points that define the line segment under evaluation. The superscript denotes the index of the high-precision measurement point. Both (A13) and (A14) are candidates for being an active constraint. Note however, that a requirement for this is that $$\alpha_{ik}^{j,p} > 0 \tag{A15}$$

$$\alpha_{il}^{j,p} > 0 \tag{A16}$$

In case (A15) and (A16) do not hold, the corresponding intersection strategy needs to be discarded.

Assuming that (A15) and (A16) hold, it remains to check if the intersection point falls between the points that limit the line segment of the polygon. This means that the following equations need to be fulfilled, for some $\beta_{ik}^{j,p} \in [0,1]$ or $\beta_{il}^{j,p} \in [0,1]$:

$$r_j^{m,p} = r_i^p(\alpha_{ik}^{j,p}) + \beta_{ik}^{j,p}(r_k^p - r_i^p) \tag{A17}$$

$$r_j^{m,p} = r_i^p(\alpha_{il}^{j,p}) + \beta_{il}^{j,p}(r_l^p - r_i^p). \tag{A18}$$

Since the vectors leading to (A13) and (A14) are parallel, it is enough to consider one of the coordinates of (A17) and (A18) when solving for $\beta^p$. The results are:

$$\beta_{ik}^{j,p} = \frac{x_j^{m,p} - x_i^p(\alpha_{ik}^{j,p})}{x_k^p - x_i^p(\alpha_{ik}^{j,p})} \tag{A19}$$

$$\beta_{il}^{j,p} = \frac{x_j^{m,p} - x_i^p(\alpha_{il}^{j,p})}{x_l^p - x_i^p(\alpha_{il}^{j,p})}. \tag{A20}$$

The final logic needed in the evaluation of the point $r_j^{m,p}$, with respect to the movement of $r_i^p$ can be briefly summarized as follows. Provided that:

$\alpha_{ik}^{j,p}>0$ and $0<\beta_{ik}^{j,p}<1$, $\alpha_{ik}^{j,p}$ represents a feasible maximum movement for the line segment between $r_i^p$ and $r_k^p$.

$\alpha_{ik}^{j,p}>0$ and $\beta_{ik}^{j,p}>\vee\beta_{ik}^{j,p}<0$, $\alpha_{ik}^{j,p}$ represents an inward point but the feasible maximum movement is not relevant since the intersection is outside the line segment between $r_i^p$ and $r_k^p$. In this case the inward movement shall not limit the minimum allowed inward movement. This is accomplished by setting $\alpha_{ik}^{j,p}=\alpha_{max}$, where $\alpha_{max}$ is a large inward movement, say 10.

$\alpha_{ik}^{j,p}<0$ and $0<\beta_{ik}^{j,p}<1$, $\alpha_{ik}^{j,p}$ represents a feasible maximum movement for the line segment between $r_i^p$ and $r_k^p$. However, since it is an outward movement, it shall be set to zero since the algorithm is designed for inward movement.

$\alpha_{il}^{j,p}>0$ and $0<\beta_{il}^{j,p}<1$, $\alpha_{il}^{j,p}$ represents a feasible maximum movement for the line segment between $r_i^p$ and $r_l^p$.

$\alpha_{il}^{j,p}>0$ and $\beta_{il}^{j,p}>1 \vee \beta_{il}^{j,p}<0$. $\alpha_{il}^{j,p}$ represents an inward point but the feasible maximum movement is not relevant since the intersection is outside the line segment between $r_i^p$ and $r_k^p$. In this case the inward movement shall not limit the minimum allowed inward movement. This is accomplished by setting $\alpha_{il}^{j,p}=\alpha_{max}$, where $\alpha_{max}$ is a large inward movement, say 10.

$\alpha_{il}^{j,p}<0$ and $0<\beta_{il}^{j,p}<1$, $\alpha_{il}^{j,p}$ represents a feasible maximum movement for the line segment between $r_i^p$ and $r_k^p$. However, since it is an outward movement, it shall be set to zero since the algorithm is designed for inward movement.

In case both $\alpha_{ik}^{j,p}$ and $\alpha_{il}^{j,p}$ are feasible maximum movements, the smallest one is chosen. The considered cases can be summed as follows:

$$\alpha_i^{j,p} = \begin{cases} \alpha_{max}. & \alpha_{ik}^{j,p}<0,\ \alpha_{il}^{j,p}>0,\ \beta_{ik}^{j,p}\notin[0,1],\ \beta_{il}^{j,p}\notin[0,1] \\ \alpha_{il}^{j,p} & \alpha_{ik}^{j,p}<0,\ \alpha_{il}^{j,p}>0,\ \beta_{ik}^{j,p}\notin[0,1],\ \beta_{il}^{j,p}\in[0,1] \\ \alpha_{max} & \alpha_{ik}^{j,p}<0,\ \alpha_{il}^{j,p}>0,\ \beta_{ik}^{j,p}\in[0,1],\ \beta_{il}^{j,p}\notin[0,1] \\ \alpha_{il}^{j,p} & \alpha_{ik}^{j,p}<0,\ \alpha_{il}^{j,p}>0,\ \beta_{ik}^{j,p}\in[0,1],\ \beta_{il}^{j,p}\in[0,1] \\ \alpha_{max} & \alpha_{ik}^{j,p}>0,\ \alpha_{il}^{j,p}<0,\ \beta_{ik}^{j,p}\notin[0,1],\ \beta_{il}^{j,p}\notin[0,1] \\ \alpha_{max} & \alpha_{ik}^{j,p}>0,\ \alpha_{il}^{j,p}<0,\ \beta_{ik}^{j,p}\notin[0,1],\ \beta_{il}^{j,p}\in[0,1] \\ \alpha_{ik}^{j,p} & \alpha_{ik}^{j,p}>0,\ \alpha_{il}^{j,p}<0,\ \beta_{ik}^{j,p}\in[0,1],\ \beta_{il}^{j,p}\notin[0,1] \\ \alpha_{ik}^{j,p} & \alpha_{ik}^{j,p}>0,\ \alpha_{il}^{j,p}<0,\ \beta_{ik}^{j,p}\in[0,1],\ \beta_{il}^{j,p}\in[0,1] \\ \alpha_{max} & \alpha_{ik}^{j,p}>0,\ \alpha_{il}^{j,p}>0,\ \beta_{ik}^{j,p}\notin[0,1],\ \beta_{il}^{j,p}\notin[0,1] \\ \alpha_{il}^{j,p} & \alpha_{ik}^{j,p}>0,\ \alpha_{il}^{j,p}>0,\ \beta_{ik}^{j,p}\notin[0,1],\ \beta_{il}^{j,p}\in[0,1] \\ \alpha_{ik}^{j,p} & \alpha_{ik}^{j,p}>0,\ \alpha_{il}^{j,p}>0,\ \beta_{ik}^{j,p}\in[0,1],\ \beta_{il}^{j,p}\notin[0,1] \\ \min\begin{pmatrix}\alpha_{ik}^{j,p}, \\ \alpha_{il}^{j,p}\end{pmatrix} & \alpha_{ik}^{j,p}>0,\ \alpha_{il}^{j,p}>0,\ \beta_{ik}^{j,p}\in[0,1],\ \beta_{il}^{j,p}\in[0,1] \\ 0 & \text{otherwise} \end{cases} \quad \text{(A21)}$$

Note that some of the listed cases may never occur. This is of less consequence in case the computations are implemented in a consecutive way, following the order of presentation of this document.

Movement with Respect to Polygon Line Segments

The intersection between the line of movement as given by (A12), and the line segment between $r_m^p$ and $r_n^p$, is given by the solution to the following system of equations, which is solved with respect to the parameters $\alpha_{i,mn}^{p}$ and $\gamma_{min}^{p}$, where the subscript refer to the points involved in the computation $$r_i^p + \alpha_{i,mn}^p (r_{CG} - r_i^p) = r_m^p + \gamma_{mn}^p (r_n^p - r_m^p) \Leftrightarrow \quad \text{(A22)}$$

$$((r_{CG} - r_i^p) - (r_n^p - r_m^p))\begin{pmatrix}\alpha_{i,mn}^p \\ \gamma_{mn}^p\end{pmatrix} = r_m^p - r_i^p.$$

The solution shall not be computed for the points adjacent to $r_i^p$. Furthermore, the intersection between the two lines falls outside the relevant line segment between $r_m^p$ and $r_n^p$ in case $\gamma_{mn}^p \notin [0,1]$. If this is the case the intersection shall be disregarded in the evaluation of the corner $r_i^p$. The requirement that $\alpha_{i,min}^p>0$ also remains. Note also that it is only needed to solve (A22) once for each corner point and iteration step of the algorithm.

To obtain the complete picture, (A22) is first solved for all line segments, excluding the ones that are adjacent to $r_i^p$. The solution with the minimum value of $\alpha_{i,mn}^p$, such that $\alpha_{i,mn}^p>0$ and $\gamma_{mn}^p \in [0,1]$, is expressed as (note that since the movement is inward such a solution always exists)

$$\alpha_{i,m_0n_0}^p, \gamma_{m_0n_0}^p \quad \text{(A23)}$$

Combination

Since all high-precision measurement points are evaluated along the same direction as far as constraints are concerned, they can be directly combined. Note also that since one point is to be removed from the interior of the polygon for each iteration step, the limiting high-precision measurement point is to be selected as the second one that becomes active. The high-precision measurement point that becomes an active constraint is hence given by (A24), where (A24) can be calculated as follows $$j_{first} = \underset{\substack{j \\ r_j^{m,p} \in P^p}}{\operatorname{argmin}} \alpha_i^{j,p} \quad \text{(A24)}$$

$$j_{activeConstraint} = \underset{\substack{j \neq j_{first} \\ r_j^{m,p} \in P^p}}{\operatorname{argmin}} \alpha_i^{j,p}.$$

The corresponding movement becomes $$\alpha_i^{p,measurementConstraints} = \alpha_i^{j_{activeConstraints},p}. \quad \text{(A25)}$$

The Result (A25) is Finally Combined with the Constraint Imposed by the possibility of self-intersection $$\alpha_i^{p,allConstraints} = \min(\alpha_i^{p,measurementConstraints}, \alpha_{i,m_0n_0}^p) - \in, \quad \text{(A26)}$$

where $\in$ is a small number that prevents that the constraint becomes exactly active, so that the search is started outside the constraining point in the next iteration step.

Obtained Polygon Area Reduction

Figure 13:
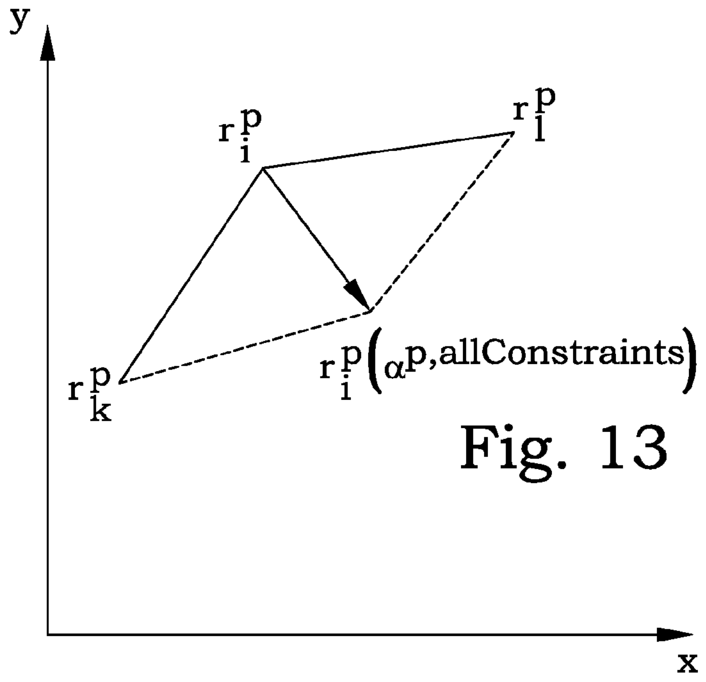
FIG. 13 is an illustration of the geometry for calculation of the area reduction.

The obtained are reduction follows by integration, or equivalently, computation of the areas under the parts of the polygon shown in FIG. 13.

By consideration of the facts that the area under the curve can be computed as sums of areas of rectangles and triangles, it is only the areas related to the moving and adjacent points that are affected by the movement, it follows that the areas before and after movement can be expressed as:

$$A_{i,before}^p = A_0 + \frac{1}{2}(x_i^p - x_k^p)(y_k^p + y_i^p) + \frac{1}{2}(x_l^p - x_i^p)(y_i^p + y_l^p) \quad \text{(A27)}$$

$$A_{i,after}^p = A_0 + \frac{1}{2}\left(x_i^p\left(\alpha_i^{p,allConstraints}\right) - x_k^p\right)\left(y_k^p + y_i^p\left(\alpha_i^{p,allConstraints}\right)\right) + \frac{1}{2}\left(x_l^p - x_i^p\left(\alpha_i^{p,allConstraints}\right)\right)\left(y_i^p\left(\alpha_i^{p,allConstraints}\right) + y_l^p\right). \quad \text{(A28)}$$

The reduction of area obtained is hence given by $$\Delta A_i^{p,allConstraints} = \left| \frac{1}{2}(x_i^p - x_k^p)(y_k^p + y_i^p) + \frac{1}{2}(x_l^p - x_i^p)(y_i^p + y_l^p) - \frac{1}{2}\left(x_i^p\left(\alpha_i^{p,allConstraints}\right) - x_k^p\right)\left(y_k^p + y_i^p\left(\alpha_i^{p,allConstraints}\right)\right) - \frac{1}{2}\left(x_l^p - x_i^p\left(\alpha_i^{p,allConstraints}\right)\right)\left(y_i^p\left(\alpha_i^{p,allConstraints}\right) + y_l^p\right) \right|. \quad \text{(A29)}$$

The maximum of this area reduction measure determines which of the $N_p$ corners to move at a specific iteration, whereas (A12) and (A26) determine the movement.

The Algorithm

In the algorithm below $N_p^{m,rem}$ denotes the number of high-precision measurement points that remain in the interior of the polygon, at each corner movement iteration step. The algorithm for polygon computation, for one specific cell relation configuration p is then:

Initialization:

- Compute the centre of gravity of all high-precision measurements of the cluster (A6).
- Compute the maximum distance r from the centre of gravity (A7), (A8).
- Compute the initial polygon distributed around the circle R (A9), (A10), (A11).

Area Minimization:

- Repeat until $N_p^{m,rem} < C^p N_p^m$ or $\alpha_i^{p,allConstraints} \leqq 0$ (Measurement removal loop).
  - Compute the centre of gravity for the points that remain in the interior of the polygon (A6).
  - For i=1 to $N_p$ (Corner movement evaluation loop).
    - For j=1 to $N_p^{m,rem}$ (Measurement point constraint evaluation loop).
      - Compute and store allowed, point-wise constrained, corner movement (A21).
    - End (Measurement point constraint evaluation loop).
    - Compute and store allowed combined, measurement constrained, movement (A24), (A25).
    - Compute and store allowed, self-intersection constrained, movement (A23).
    - Compute and store combined allowed, measurement and self-intersection constrained, movement (A26).
    - Compute and store area reduction (A29), corresponding to (A26).
  - End (Corner movement evaluation loop).
  - Find the corner with index $i_0$ corresponding to the maximum area reduction.
  - Update (A12) the corner $i_0$ with the movement $\alpha_{i_0}^{p,allConstraints}$.
  - Remove the high-precision measurement point that is no longer in the interior of the polygon, from any lists of interior points.

$$N_p^{m,rem} := N_p^{m,rem} - 1.$$

- End (Measurement removal loop).
- Transform the final corner points of the polygon to WGS 84c latitudes and longitudes.

The invention claimed is:

1. A method of enhanced horizontal position determination for a user terminal associated with at least one cell in a cellular communications network by a node in the cellular communications network, said method comprising:

- acquiring a predetermined cell identity definition including a predetermined map with altitude information;
- receiving a representation of a barometric pressure measure for said user terminal, said barometric pressure measure corresponding to an altitude of the user terminal; and
- determining at least one geographical region definition based on said provided predetermined cell identity definition and said representation of barometric pressure measure, said at least one geographical region definition corresponding to a horizontal region included in said predetermined map and corresponding to said representation of barometric pressure measure.

2. The method according to claim 1, wherein said predetermined cell identity definition corresponds to a geographical cell area definition.

3. The method according to claim 2, wherein said at least one determined geographical region definition is a new geographical cell area definition, said new geographical cell area definition being within said predetermined geographical cell area definition.

4. The method according to claim 1, wherein said representation of said barometric pressure measure comprises a maximum threshold and a minimum threshold for said barometric pressure measure, and said determining step comprises determining a first geographical region definition corresponding to said maximum threshold and a second geographical region definition corresponding to said minimum threshold, said first geographical region and said second geographical region defining a closed geographical region which is an annular horizontal region, inside which said user terminal is located.

5. The method according to claim 4, wherein each of said first and second geographical region definitions is based on said predetermined map with altitude information.

6. The method according to claim 4, wherein each of said first and second geographical region definitions comprises a first map with altitude information corresponding to said first geographical region and a second map with altitude information corresponding to said second geographical region, respectively.

7. The method according to claim 1, further comprising receiving a plurality of measurement clusters, said plurality of measurement clusters including high precision horizontal position measures, each of said high precision horizontal position measures corresponding to a specific tag, said specific tag being based on said representation of said barometric pressure measure and said predetermined cell identity definition.

8. The method according to claim 7, wherein said determining step comprises determining a geographical region definition which contains a pre-specified fraction of said clustered high precision horizontal position measurements, and associating said determined geographical region definition with said specific tag of said cluster.

9. The method according to claim 1, wherein each said at least one determined geographical region definition is a cell area definition.

10. The method according to claim 1, wherein said cell area definition is a polygon.

11. The method according to claim 1, wherein said representation of said barometric pressure measure comprises a maximum threshold and a minimum threshold, and said determining step comprises determining a first polygon corresponding to said maximum threshold and a second polygon corresponding to said minimum threshold, each of which includes a closed geographical region comprising the geographical location of said user terminal.

12. The method according to claim 1, further comprising:

- generating a tag based on said representation of barometric pressure measure and said predetermined cell identity definition;
- retrieving at least one determined geographical region definition corresponding to said tag; and
- representing a position of said user terminal with said determined at least one geographical region.

13. The method according to claim 12, wherein said representation of barometric pressure measure comprises a maximum threshold and a minimum threshold for said representation of said barometric pressure measure, and said determining step comprises determining a first geographical definition corresponding to said maximum threshold and a second geographical region definition corresponding to said minimum threshold, said first geographical region and said second geographical region defining a closed geographical region which is an annular horizontal region inside which said user terminal is located.

14. The method according to claim 12, wherein said at least one determined geographical region definition is a cell area definition.

15. The method according to claim 14, wherein said cell area definition is a polygon.

16. The method according to claim 13, wherein each of said first and second geographical region definitions comprises a first polygon corresponding to said first geographical region definition and a second polygon corresponding to said second graphical region definition, respectively.

17. The method according to claim 1, wherein said receiving step comprises measuring said barometric pressure measure for said user terminal, and receiving said representation of said barometric pressure measure to said node in said cellular communications network.

18. The method according to claim 1, wherein said representation of said barometric pressure measure comprises an altitude.

19. The method according to claim 1, wherein said receiving step comprises performing calibration measurements at a known location in said cellular communications network and calibrating the barometric pressure measure of said user terminal based on said calibration measurements.

20. The method according to claim 1, wherein said representation of said barometric pressure measure comprises a calibrated representation of said barometric pressure measure.

21. A system for enhanced horizontal position determination of a user terminal associated with at least one cell in a cellular communications network, comprising:

means for providing a predetermined cell identity definition including a predetermined map with altitude information;

means for receiving a representation of a barometric pressure measure from said user terminal, said barometric pressure measure corresponding to an altitude of the user terminal; and means for determining at least one geographical region definition based on said provided predetermined cell identity definition and said representation of barometric pressure measure, said at least one geographical region definition corresponding to a horizontal region included in said predetermined map and corresponding to said representation of barometric pressure measure.

22. The system according to claim 21, further comprising means for performing calibration measurements and reporting said calibration measurements to said user terminal.

23. The system according to claim 21, wherein said means for receiving said representation of said barometric pressure measure comprises means for calibrating said barometric pressure measure based on said received calibration measurements to provide a representation of a calibrated barometric pressure measure.

24. A node enabling enhanced position determination of a user terminal associated with at least one cell in a cellular communications network, said node comprising:

means for acquiring a predetermined cell identity definition including a predetermined map with altitude information;

means for receiving a representation of a barometric pressure measure from said user terminal, said barometric pressure measure corresponding to an altitude of the user terminal; and means for determining at least one geographical region definition based on said provided predetermined cell identity definition and said representation of barometric pressure measure, said at least one geographical region definition corresponding to a horizontal region included in said predetermined map and corresponding to said representation of barometric pressure measure.

25. The node according to claim 24, wherein said node is one of a radio base station, a radio network controller, a relay station.

* * * * *

UNITED STATES PATENT AND TRADEMARK OFFICE

CERTIFICATE OF CORRECTION

PATENT NO. : 8,229,459 B2
APPLICATION NO. : 12/445290
DATED : July 24, 2012
INVENTOR(S) : Wigren It is certified that error appears in the above-identified patent and that said Letters Patent is hereby corrected as shown below:

In Column 2, Line 37, delete “KIT” and insert -- RTT --, therefor.

In Column 4, Line 7, delete “polygon:” and insert -- polygon; --, therefor.

In Column 4, Line 9, delete “element:” and insert -- element; --, therefor.

In Column 4, Line 10, delete “MT” and insert -- RTT --, therefor.

In Column 4, Line 10, delete “measurements:” and insert -- measurements; --, therefor.

In Column 4, Line 11, delete “measurements.” and insert -- measurements; --, therefor.

In Column 4, Lines 12-13, delete “system:” and insert -- system; --, therefor.

In Column 4, Line 16, delete “signals:” and insert -- signals; --, therefor.

In Column 4, Line 18, delete “art:” and insert -- art; --, therefor.

In Column 4, Line 20, delete “models:” and insert -- models; --, therefor.

In Column 4, Line 22, delete “invention:” and insert -- invention; --, therefor.

In Column 4, Line 26, delete “method:” and insert -- method; --, therefor.

In Column 4, Line 28, delete “movement:” and insert -- movement; and --, therefor.

In Column 4, Line 30, delete “reduction;” and insert -- reduction. --, therefor.

In Column 7, Line 6, delete “RTF” and insert -- RTT --, therefor.

Signed and Sealed this
Twenty-fifth Day of December, 2012

David J. Kappos

David J. Kappos
*Director of the United States Patent and Trademark Office*

In Column 7, Line 7, delete “rise)” and insert -- rise). --, therefor.

In Column 7, Line 34, delete “arc” and insert -- arc. --, therefor.

In Column 7, Line 39, delete “measure,” and insert -- measure. --, therefor.

In Column 10, Line 9, delete “[3].” and insert -- [3], --, therefor.

In Column 10, Line 57, delete “region.” and insert -- region, --, therefor.

In Column 11, Line 29, delete “steps of” and insert -- steps of: --, therefor.

In Column 13, Line 33, delete “$T_{pCaLbrationExpires,}$” and insert -- $T_{pCalibrationExpires,}$ --, therefor.

In Column 13, Line 47, delete “$P_{CalibratedMeasurement}$” and insert -- $p_{CalibratedMeasurement}$ --, therefor.

In Column 14, Line 2, delete “a” and insert -- in a --, therefor.

In Column 15, Lines 13-14, delete “follows.” and insert -- follows: --, therefor.

In Column 15, Line 31, delete “$h_{max}$” and insert -- $h_{max}$ of --, therefor.

In Column 15, Line 59, delete “House.” and insert -- House, --, therefor.

In Column 15, Line 65, delete “Wigren.” and insert -- Wigren, --, therefor.

In Column 16, Line 3, delete “/axn500.asp” and insert -- /axn500.asp. --, therefor.

In Column 18, Lines 8-9,
delete “Nonlinear Optimization Problem. Many Methods that May” and insert
-- nonlinear optimization problem. Many methods that may --, therefor.

In Column 19, Line 60, delete “$r_i^p$” and insert -- $r_l^p$ --, therefor.

In Column 20, Line 58, delete “ $\alpha_{ik}^{j,p}>0$ and $\beta_{ik}^{j,p}>\vee\beta_{ik}^{j,p}<0$, $\alpha_{ik}^{j,p}$ ” and insert -- $\alpha_{ik}^{j,p}>0$ and $\beta_{ik}^{j,p}>1\vee\beta_{ik}^{j,p}<0$, $\alpha_{ik}^{j,p}$ $\alpha_{ik}^{j,p}$ --, therefor.

In Column 21, Line 46, delete “$\gamma_{min}^{p}$,” and insert -- $\gamma^{p}{}_{mn}$, --, therefor.

In Column 22, Lines 28-29,
delete “Result (A25) is Finally Combined with the Constraint Imposed” and
insert -- result (A25) is finally combined with the constraint imposed --, therefor.

In Column 25, Line 13, in Claim 16, delete “graphical” and insert -- geographical --, therefor.

UNITED STATES PATENT AND TRADEMARK OFFICE

CERTIFICATE OF CORRECTION

Figure 1:
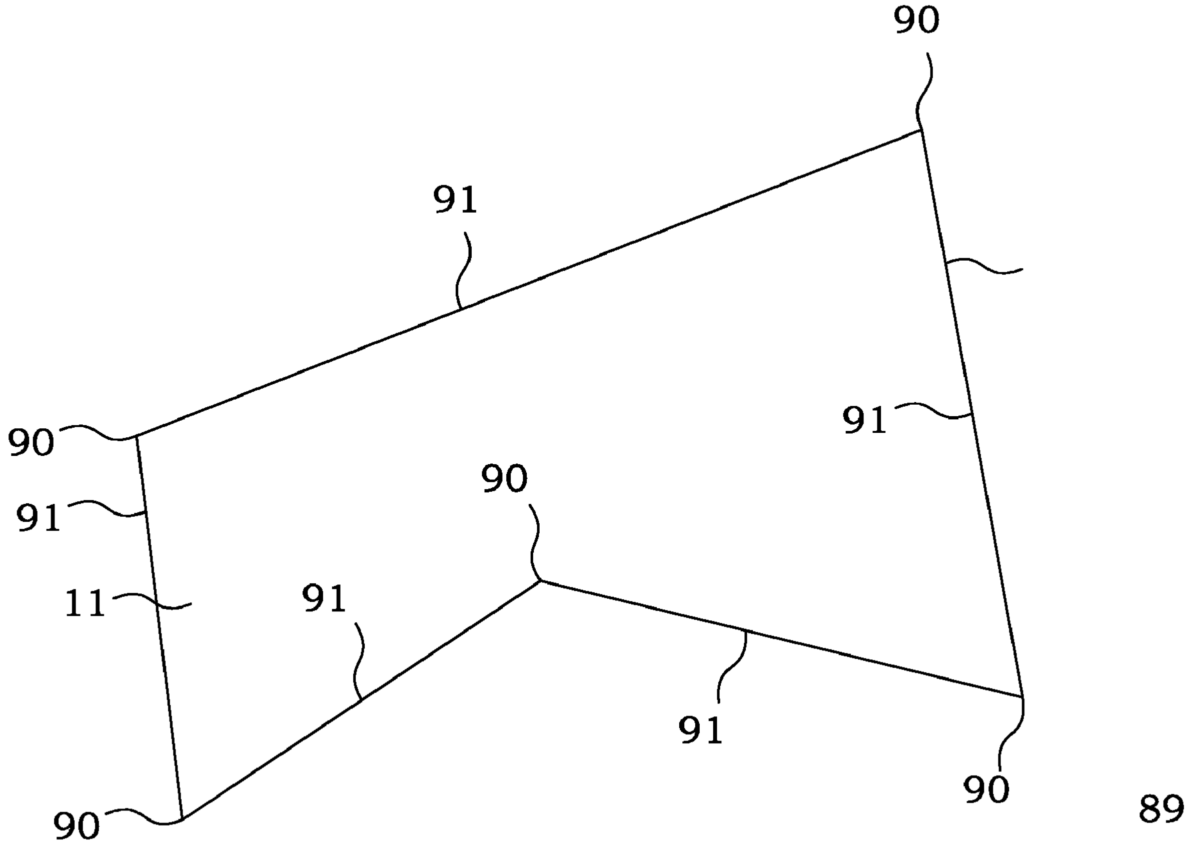
FIG. 1 is an example of a cell polygon.
Figure 2:
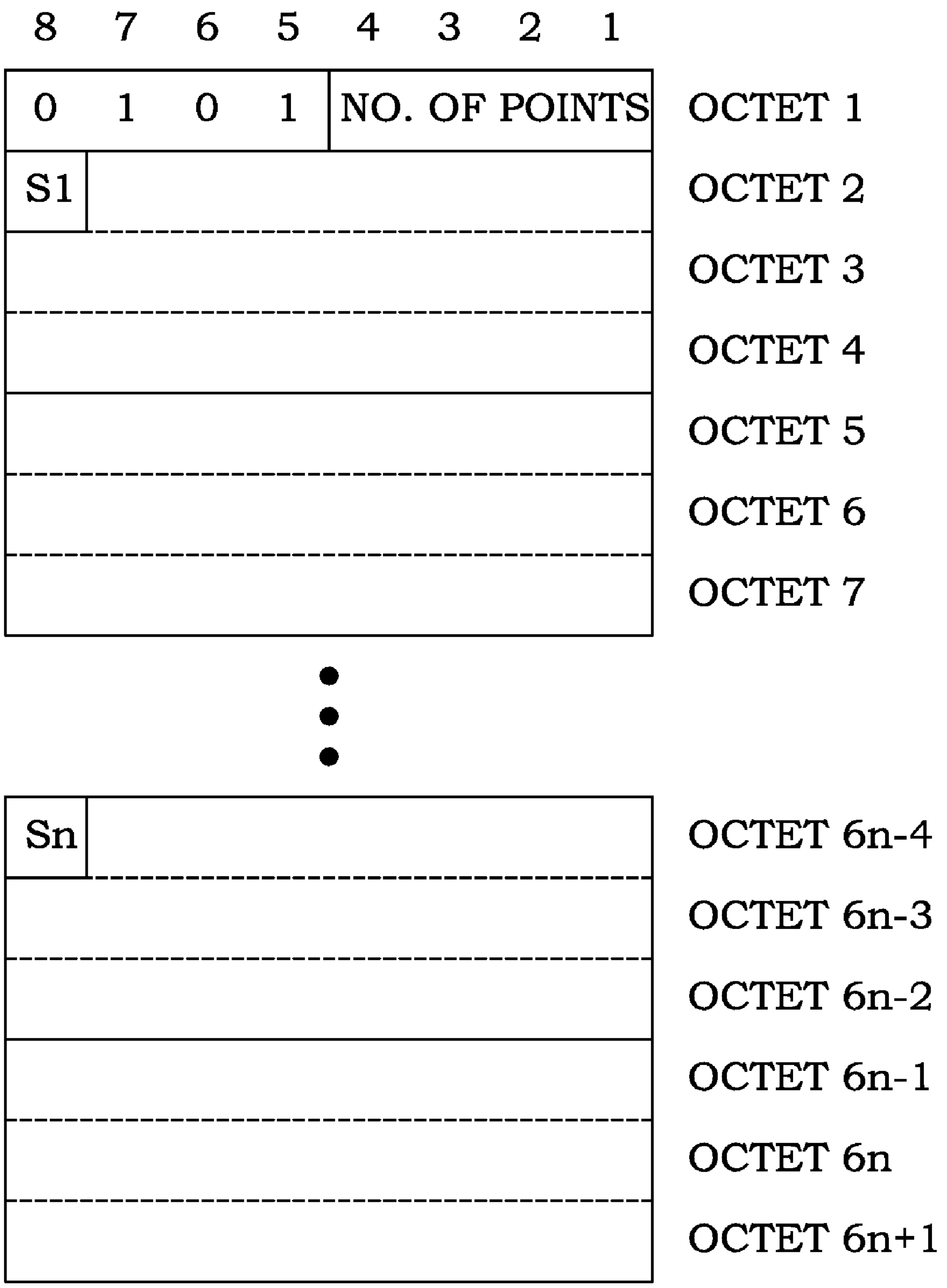
FIG. 2 is an illustration of a 3GPP polygon message information element.

PATENT NO. : 8,229,459 B2
APPLICATION NO. : 12/445290
DATED : July 24, 2012
INVENTOR(S) : Torbjörn Wigren It is certified that error appears in the above-identified patent and that said Letters Patent is hereby corrected as shown below:

In the Drawings:

Delete Drawing Figure 1, and replace Drawing Figure 1, shown below.

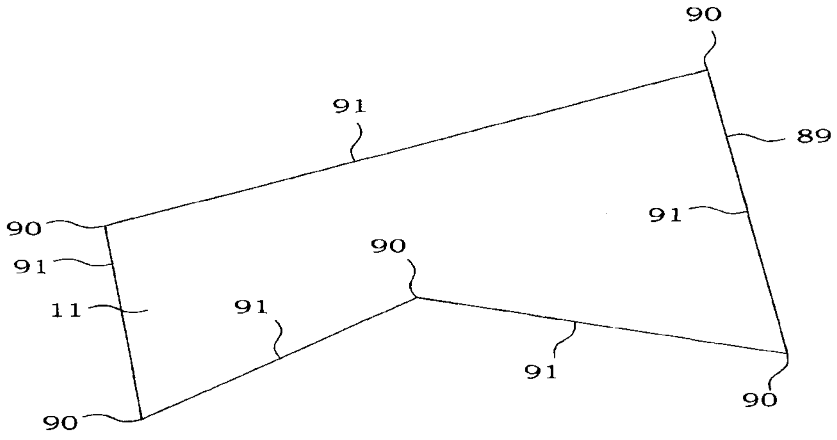

Signed and Sealed this
Twenty-fifth Day of June, 2013

Teresa Stanek Rea
*Acting Director of the United States Patent and Trademark Office*